US009153004B2

United States Patent
Hirano

(10) Patent No.: US 9,153,004 B2
(45) Date of Patent: Oct. 6, 2015

(54) PRODUCT IMAGE INTERPOLATING DEVICE, METHOD AND NON-TRANSITORY INFORMATION RECORDING MEDIUM

(71) Applicant: Hiromi Hirano, Tokyo (JP)

(72) Inventor: Hiromi Hirano, Tokyo (JP)

(73) Assignee: Rakuten, Inc., Tokyo (JP)

( * ) Notice: Subject to any disclaimer, the term of this patent is extended or adjusted under 35 U.S.C. 154(b) by 362 days.

(21) Appl. No.: 13/764,283

(22) Filed: Feb. 11, 2013

(65) Prior Publication Data

US 2013/0156259 A1 Jun. 20, 2013

Related U.S. Application Data

(62) Division of application No. 13/814,834, filed as application No. PCT/JP2010/067003 on Sep. 29, 2010.

(30) Foreign Application Priority Data

Aug. 30, 2010 (JP) .................................. 2010-192927

(51) Int. Cl.
*G06K 9/00* (2006.01)
*G06T 1/00* (2006.01)
*H04N 5/232* (2006.01)
(Continued)

(52) U.S. Cl.
CPC ............. *G06T 1/0007* (2013.01); *G06T 3/0006* (2013.01); *H04N 5/232* (2013.01); *H04N 5/23293* (2013.01); *H04N 5/2625* (2013.01)

(58) Field of Classification Search
CPC ... G06T 1/0007; G06T 3/0006; G06T 3/0081; G06T 7/0051; G06T 7/0061; G06T 7/0065; G06T 7/0067; G06T 7/0071; H04N 5/23293; H04N 5/2625
See application file for complete search history.

(56) References Cited

U.S. PATENT DOCUMENTS

2003/0030636 A1   2/2003  Yamaoka
2006/0078224 A1   4/2006  Hirosawa
(Continued)

FOREIGN PATENT DOCUMENTS

JP          2-178646 A       7/1990
JP          4-347979 A      12/1992
(Continued)

OTHER PUBLICATIONS

Seitz et al., "Physically-valid view synthesis by image interpolation" Jun. 24, 1995, Proc. IEEE Workshop on Representation of Visual Scenes, 1995, p. 18-25.*

(Continued)

*Primary Examiner* — Bhavesh Mehta
*Assistant Examiner* — Timothy Choi
(74) *Attorney, Agent, or Firm* — Sughrue Mion, PLLC

(57) ABSTRACT

A product imaging device (121) is provided which facilitates a user to capture the image sequence of entire surroundings of a product. An image sensor unit (201) senses incident light from the external world where the product is disposed and outputs an image representing a result of the sensing. An instruction receiving unit (202) receives an image-capture instruction from the user. A memory unit (203) stores the image sensed by the image sensor unit (201) upon reception of an image-capture instruction. A finder display unit (204) synthesizes the image stored in the memory unit (203) with an image presently sensed by the image sensor unit (201) and displays a synthesized image on a finder screen.

3 Claims, 9 Drawing Sheets

(51) Int. Cl.
*H04N 5/262* (2006.01)
*G06T 3/00* (2006.01)

(56) References Cited

U.S. PATENT DOCUMENTS

2006/0187204 A1   8/2006   Yi et al.
2008/0170803 A1   7/2008   Forutanpour

FOREIGN PATENT DOCUMENTS

| JP | 6-105193 A | 4/1994 |
| JP | 11-88731 A | 3/1999 |
| JP | 2000-299804 A | 10/2000 |
| JP | 2001-285894 A | 10/2001 |
| JP | 2002-133447 A | 5/2002 |
| JP | 2004-72685 A | 3/2004 |
| JP | 2005-49999 A | 2/2005 |
| JP | 2006-244306 A | 9/2006 |
| JP | 2007-174301 A | 7/2007 |
| JP | 2009-5254 A | 1/2009 |
| JP | 2009-183003 A | 8/2009 |
| JP | 2009-246937 A | 10/2009 |

OTHER PUBLICATIONS

"Live Preview", Wikipedia page, 5 pgs.
International Search Report for PCT/JP2010/067003 dated Nov. 30, 2010.
K. Yasuda et al., "3-D Dense Model Generation from A Sparse Image Sequence", IPSJ SIG Technical Report, 2003, pp. 73-80.
Mukunoki et al., "3D Model Generation from Image Sequences Using Global Geometric Constraint" Proc. of the First Int. Conf. on Advances in Visual Computing, ISVC 2005. Dec. 2005, pp. 470-477.

* cited by examiner

PRODUCT IMAGE INTERPOLATING DEVICE, METHOD AND NON-TRANSITORY INFORMATION RECORDING MEDIUM

CROSS REFERENCE TO RELATED APPLICATIONS

This application is a divisional of U.S. patent application Ser. No. 13/814,834, filed on Feb. 7, 2013, which is a National Stage of International Application No. PCT/JP2010/067003 filed Sep. 29, 2010, claiming priority based on Japanese Patent Application No. 2010-192927 filed Aug. 30, 2010, the contents of all of which are incorporated herein by reference in their entirety.

TECHNICAL FIELD

The present invention relates to a product imaging device, a product imaging method, an image conversion device, an image processing device, an image processing system, a program and an information recording medium that facilitate a user to capture an image sequence of the entire outer viewable surface of a product.

BACKGROUND ART

An image sequence of an object using a plurality of images obtained by sequentially imaging an object's entire viewable exterior surface that can be applied to various purposes, such as a generation of a three-dimensional shape model of the object (see, for example, Non-Patent Literature 1) and apparent exhibition of the external shape of a product to a consumer.

The images of an object's entire viewable exterior surface can be obtained by successively capturing images of the appearances including an object in the real world while moving a camera so that the image capture direction thereof is directed to the object over the course of a full circular path around the object.

Hence, in order to capture images from an object's entire surrounding, it is necessary to set the position and direction of the camera to meet the above-explained technique, and thus special instruments are typically necessary.

Conversely, in recent days, inexpensive digital cameras have become popular. Digital camera lenses capture reflective light from the external world including from an object and an image sensor like a CCD (Charge Coupled Device) forms an image of the external world.

When a user depresses a shutter, an image in an electronic file format is created based on the intensity, wavelength, etc., of the light sensed by the image sensor within a certain short time after the depression of the shutter. The electronic file corresponds to a developed film and a developed printed paper in the case of conventional optical cameras.

Moreover, technologies often called a live preview, and a live view also have become popular. According to the live preview, an image which is presently detected by an image sensor is directly displayed on a screen like a liquid crystal display in a real-time manner (see, for example, Non-Patent Literature 2). That is, according to the live preview, an electronic finder through a liquid crystal display, etc., is utilized.

An image displayed on a finder screen by the live preview corresponds to "an image to be obtained if a user depresses a shutter currently at this moment".

Hence, if the live preview is utilized, it is possible for the user to check a composition, an exposure, etc., of an object prior to imaging.

PRIOR ART DOCUMENTS

Non-Patent Literatures

Non-Patent Literature 1: Kazutaka YASUDA, Takeshi MIGITA, Masato AOYAMA, Masayuki KUREKI, Naoki ASADA, "Generation of Dense Three-dimensional Shape Model from Rough Image Sequence of Entire Surroundings", Research Report of Information Processing Society of Japan, CVIM, Computer Vision and Image Media, 2003-CVIM-138 (11), pages 73 to 80, http://harp.lib.hi-roshima-u.ac.jp/bitstream/harp/6507, May 8, 2003.

Non-Patent Literature 2: Wikipedia, The Free Encyclopedia, Live Preview, http://en.wikipedia.org/wiki/Live_preview, Jun. 15, 2010.

DISCLOSURE OF INVENTION

Problem to be Solved by the Invention

However, when it is desirable for an owner of a small store or an individual exhibitor of an auction to pick up images from the object's entire surroundings to introduce a product, preparation of the above-explained special instruments is not realistic.

Accordingly, there is a demand for a technology which facilitates acquisition of an image sequence from an object's entire surroundings or acquisition of an image sequence that can be easily converted into an image sequence from an object's entire surroundings after the image-capture.

The present invention is to address the above-explained technical issues, and it is an object of the present invention to provide a product imaging device, a product imaging method, an image conversion device, an image processing device, an image processing system, a program and an information recording medium that appropriately allow a user to easily capture an image sequence from the entire surroundings of a product.

Means for Solving the Problem

A first aspect of the present invention provides a product imaging device that includes: an image sensor unit which senses incident light from an external world where a product is disposed and which outputs an image representing a result of the sensing; an instruction receiving unit that receives an image-capture instruction from a user; a memory unit which stores, upon reception of the image-capture instruction, the image sensed by the image sensor unit; and a finder display unit which synthesizes the image stored in the memory unit with an image presently sensed by the image sensor unit and which displays a synthesized image on a finder screen.

In the above-explained product imaging device, the finder display unit alternately displays the image stored in the memory unit and the image presently sensed by the image sensor unit on the finder screen.

In the above-explained product imaging device, the finder display unit makes a result by applying a predetermined image filter on the image stored in the memory unit in order to make the image semi-transparent, and superimposes the semi-transparent result on the image presently sensed by the image sensor unit to synthesize images.

In the above-explained product imaging device, when there are a plurality of images stored in the memory unit, the finder display unit synthesizes the image stored at first with the image presently sensed by the image sensor unit.

The product imaging device further includes a tilt sensor unit that senses a tilting of the product imaging device, in which the memory unit stores, upon reception of the image-capture instruction, the image sensed by the image sensor unit in association with a tilting sensed by the tilt sensor unit, and the display unit displays the tilting stored in association with the image stored in the memory unit, and a tilting presently sensed by the tilt sensor unit on the finder screen.

A second aspect of the present invention provides an image conversion device that includes: an image receiving unit which receives a plurality of images of a product captured and stored by the product imaging device around a product, and a tilting associated with each image; and a converter unit that converts the received plurality of images into an image sequence from a product's entire surroundings based on the tilting associated with each image.

A third aspect of the present invention provides an image processing device that includes: an angle accepting unit that accepts an angle relative to a predetermined rotational axis; and an interpolating unit which interpolates the image sequence from a product's entire surroundings obtained by the image conversion device based on the accepted angle, and which obtains an interpolated image representing an appearance of the product as viewed from the accepted angle.

The image processing device further includes: an angle sensor unit that senses an angle of the image processing device relative to a predetermined axis; and a monitor display unit that displays the obtained interpolated image on a monitor screen, in which the angle accepting unit accepts the sensed angle.

A fourth aspect of the present invention provides an image processing system that includes the above-explained image processing device and a terminal device coupled with the image processing device so as to communicate with each other.

The terminal device includes: an angle sensor unit that senses an angle of the terminal device relative to a predetermined axis; and an angle transmitter unit that transmits the sensed angle to the image processing device.

The image processing device includes: an angle receiver unit which receives an angle transmitted from the terminal device and which causes the angle accepting unit to accept the angle; and an image transmitter unit that transmits the obtained interpolated image to the terminal device.

The terminal device further includes: an image receiver unit that receives the interpolated image transmitted from the image processing device; and a monitor display unit that displays the received interpolated image on a monitor screen.

A fifth aspect of the present invention provides a product imaging method executed by a product imaging device comprising an image sensor unit, an instruction receiving unit, a memory unit, and a display unit, and the method includes: an image sensor process of causing the image sensor unit to sense light incident from an external world where a product is disposed and to output an image representing a result of the sensing; an instruction receiving process of causing the instruction receiving unit to receive an image-capture instruction from a user; a memory process of causing the memory unit to store, upon reception of the image-capture instruction, the image sensed by the image sensor unit; and a finder display process of causing the display unit to synthesize the image stored in the memory unit with an image presently sensed by the image sensor unit and to display a synthesized image on a finder screen.

A sixth aspect of the present invention provides a program that allows a computer to function as: an image sensor unit which senses incident light from an external world where a product is disposed and which outputs an image representing a result of the sensing; an instruction receiving unit that receives an image-capture instruction from a user; a memory unit which stores, upon reception of the image-capture instruction, the image sensed by the image sensor unit; and a finder display unit which synthesizes the image stored in the memory unit with an image presently sensed by the image sensor unit and which displays a synthesized image on a finder screen.

A seventh aspect of the present invention provides a computer-readable information recording medium having recorded therein a program that allows a computer to function as: an image sensor unit which senses incident light from an external world where a product is disposed and which outputs an image representing a result of the sensing; an instruction receiving unit that receives an image-capture instruction from a user; a memory unit which stores, upon reception of the image-capture instruction, the image sensed by the image sensor unit; and a finder display unit which synthesizes the image stored in the memory unit with an image presently sensed by the image sensor unit and which displays a synthesized image on a finder screen.

That is, the program of the present invention can be recorded in a computer-readable information recording medium, such as a compact disc, a flexible disc, a hard disk, a magneto-optical disk, a digital video disk, a magnetic tape, or a semiconductor memory.

The program can be solely distributed and sold over a communication network independently from the computer that executes such a program. Moreover, the information recording medium can be solely distributed and sold independently from such a computer.

Effect of the Invention

According to the present invention, a product imaging device, a product imaging method, an image conversion device, an image processing device, an image processing system, a program and an information recording medium can be provided which appropriately allow a user to easily capture an image sequence from the entire surroundings of a product.

BEST MODE FOR CARRYING OUT THE INVENTION

An embodiment of the present invention will be explained below. The embodiment is to explain the invention, and is not to limit the scope and spirit of the present invention. Hence, it should be understood that those skilled in the art can carry out embodiments in which some of or all of the units are replaced with equivalents, and such embodiments are also included within the scope and spirit of the present invention.

<1. Image Processing System>

Figure 1:
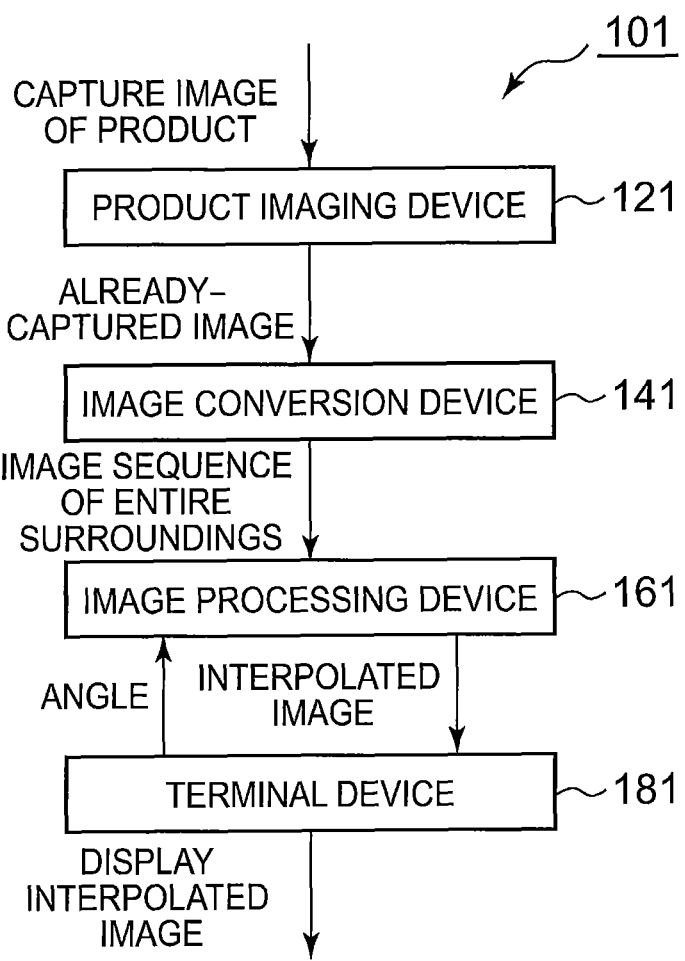
FIG. 1 is an explanatory diagram showing a general configuration of an image processing system according to an embodiment of the present invention.

FIG. 1 is an explanatory diagram showing a general configuration of an image processing system according to an embodiment. The explanation below will be given with reference to this figure.

An image processing system 101 of this embodiment includes a product imaging device 121, an image conversion device 141, an image processing device 161, and a terminal device 181.

The product imaging device 121 is used by an owner of a shop or an exhibitor of an auction, etc., who attempts to introduce a product to capture images of the product. Typically, the product imaging device 121 is a digital camera, a cellular phone, or a smart phone, etc., having an information processing function, but may be a personal computer, etc., having a camera connected thereto via a USB (Universal Serial Bus).

A person who attempts to capture images uses the product imaging device 121 in such a way that the product is arranged at the center of a visual field as much as possible and a distance between the product and the product imaging device 121 is maintained at constant as much as possible. Next, the person who attempts to capture images repeats image-capture while going around the product by one turn or rotating the product itself, thereby obtaining a plurality of product images.

The image conversion device 141 converts the plurality of product images picked up by the product imaging device 121 into an image sequence of entire surroundings of the product. The image sequence of the entire outer viewable exterior surface is a set of images obtained when it is presumed that a camera moving around the circumference around a rotational axis passing all the way through the product captures images of the product with an optical axis direction being directed towards the product.

Hence, the images based on a presumption that such images are captured with the angle from the rotational axis to the camera through the product being constant, the distance between the rotational axis and the camera being constant, and the distance between the product and the camera being also constant are the images of the entire outer viewable exterior surface.

As explained above, the person who attempts to capture images by using the product imaging device 121 is not skilled in such a special imaging technique, and does not use any special instruments. Hence, according to this embodiment, various aids are carried out to facilitate the acquisition of the image sequence the entire outer viewable exterior surface as much as possible when the product imaging device 121 is used.

That is, at the time of image-capture, according to this embodiment, an electronic finder like a liquid crystal display is utilized for a live preview. The finder screen of the electronic finder displays the current appearance of the product as viewed through the product imaging device 121, and also the past appearance of the product having already captured in a superimposed manner.

Hence, the person who attempts to pick up images can pick up images of the product while comparing with the past records regarding in what size the product is in the image and in what angle the product is in the image. Accordingly, the angle from the rotational axis to the product imaging device 121 through the product and the distance between the product and the product imaging device 121 can be set constant as much as possible.

The image conversion device 141 converts the plurality of product images into the image sequence of entire surroundings, but the conversion result obtained through this embodiment is a kind of approximation, and a feature of this embodiment is a point that a complex calculation disclosed in Non-Patent Literature 1 is unnecessary.

The image conversion device 141 obtains the image sequence of entire surroundings from the product images, and the image processing device 161 manages the image sequence of entire surroundings of the product, but typically, both devices are configured by a server device for an Internet retailing of such a product.

That is, the owner of the shop, etc., uploads the plurality of product images picked by himself/herself through the product imaging device 121 like a digital camera to the server device.

The server device functions as the image conversion device 141 to convert the product images into the image sequence of entire surroundings.

Moreover, the server device functions as the image processing device 161 to allow a user who is planning to purchase the product through an Internet mail-order trading or an Internet auction to browse the image sequence of entire surroundings. At this time, another feature of this embodiment is to execute an appropriate image processing to attract the user, not to directly provide the image sequence of entire surroundings to the user.

With respect to the image processing device 161 that serves as the Web server, the terminal device 181 functions as a Web terminal, and requests the image processing device 161 to appropriately provide the image sequence of entire surroundings. That is, the terminal device 181 is, for example, a personal computer, a cellular phone, or a smart phone that can be connected to a computer communication network like the Web.

The image sequence of entire surroundings is a series of successive images arranged to show the appearance of the product when going therearound by a turn.

According to this embodiment, the terminal device 181 notifies the image processing device 161 of the image at which angle in the turn the user desires to view the product.

Upon this notification, the image processing device 161 executes an interpolation process appropriately on the image sequence of entire surroundings, and generates an interpolated image showing the external appearance of the product in accordance with such an angle.

Next, the image processing device 161 transmits the interpolated image to the terminal device 181, and the terminal device 181 displays the interpolated image on the monitor screen.

It is possible to employ a configuration in which the user can directly input an angle from the terminal device 181 through a keyboard or a touch panel. However, some cellular phones and smart phones, etc., have a compass function, a GPS (Global Positioning System) function, and a tilt detecting function using an acceleration sensor, etc.

Hence, if the angle obtained through such functions is directly used or an angle multiplied by a certain constant is used, the direction of the product expressed on the interpolated image can be changed by simply changing the direction of the terminal device 181. This is the other feature of this embodiment that the user can observe the external appearance of the product by a turn through a simple operation.

According to this embodiment, the image processing device 161 and the terminal device 181 are configured by separate devices, but both devices may be configured together by a personal computer, a smart phone, or a cellular phone, etc. In this case, transmission and reception of information between the terminal device 181 and the image processing device 161 can be realized by exchanging of electrical signals in the electronic circuits of a device.

For example, the image sequence of entire surroundings of the product is downloaded to a smart phone from the Web server configuring the image conversion device 141. Next, the smart phone functions as the image processing device 161, and the smart phone generates an interpolated image from the image sequence of the entire surroundings in accordance with the tilting of the smart phone, and displays the interpolated image on the monitor screen.

Whether respective functions for the image processing of the present invention are realized by various server-client schemes in a distributed manner or are realized by a solo device can be changed as needed as explained above depending on the purpose and performance of an information processing device realizing the image processing like a computer.

Next, respective devices of the image processing system 101 according to this embodiment will be explained in more detail below.

<2. Product Imaging Device>

Figure 2:
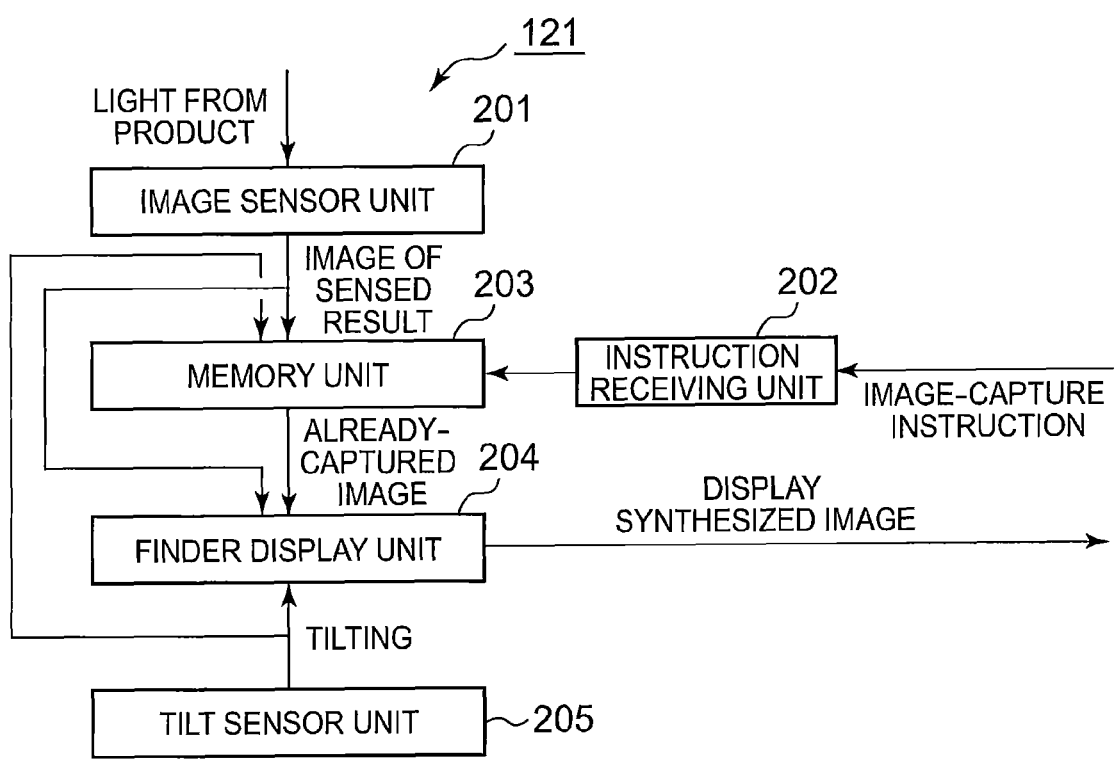
FIG. 2 is an explanatory diagram for explaining a general configuration of a product imaging device according to an embodiment of the present invention.

FIG. 2 is an explanatory diagram for explaining a general configuration of the product imaging device 121 according to this embodiment. An explanation will be given with reference to this figure.

The product imaging device 121 includes an image sensor unit 201, an instruction receiving unit 202, a memory unit 203, and a finder display unit 204. Moreover, the product imaging device may be configured to further have a tilt sensor unit 205.

That is, the image sensor unit 201 senses incident light from the external world where the product is disposed, and outputs an image representing the sensing result.

Typically, the image sensor unit 201 is an image sensor like a CCD. The light sensed by the image sensor unit 201 reaches thereto through lenses and various apertures.

Conversely, the instruction receiving unit 202 receives an instruction for an image-capture from the user. The instruction receiving unit 202 corresponds to a so-called shutter button.

Moreover, the memory unit 203 stores the image sensed by the image sensor unit 201 upon reception of the image-capture instruction.

The memory unit 203 is typically a non-volatile information memory medium, such as a flash memory card like an EEPROM (Electrically Erasable Programmable Read Only Memory), or a hard disk, which records a picked-up image file.

The finder display unit 204 displays the image sensed by the image sensor unit 201 on the finder screen.

The person who attempts to pick up images adjusts the position and direction of the product imaging device 121 and adjusts the focus and the aperture while referring to the image displayed on the finder screen.

The functions of respective units are the same as a digital camera built with a live preview function.

According to this embodiment, the finder display unit 204 has a feature of synthesizing the image sensed by the image sensor unit 201 with the image stored in the memory unit 203 when the image sensed by the image sensor unit is displayed on the finder screen.

In such synthesis, the image representing the visual field of the past image-capture and the image representing the visual field for a present image-capture are disposed in a superimposed manner on the finder screen. Hence, the person who attempts to pick up images can adjust the position and direction of the product imaging device 121 while comparing both images in a real-time manner.

The most simplest synthesis technique for superimposing the two images is to make the image (an already-picked-up image) stored in the memory unit 203 semi-transparent, superimpose on synthesize with the image (a live-preview image) sensed by the image sensor unit 201, and display the live preview image on the finder screen.

Figure 3:
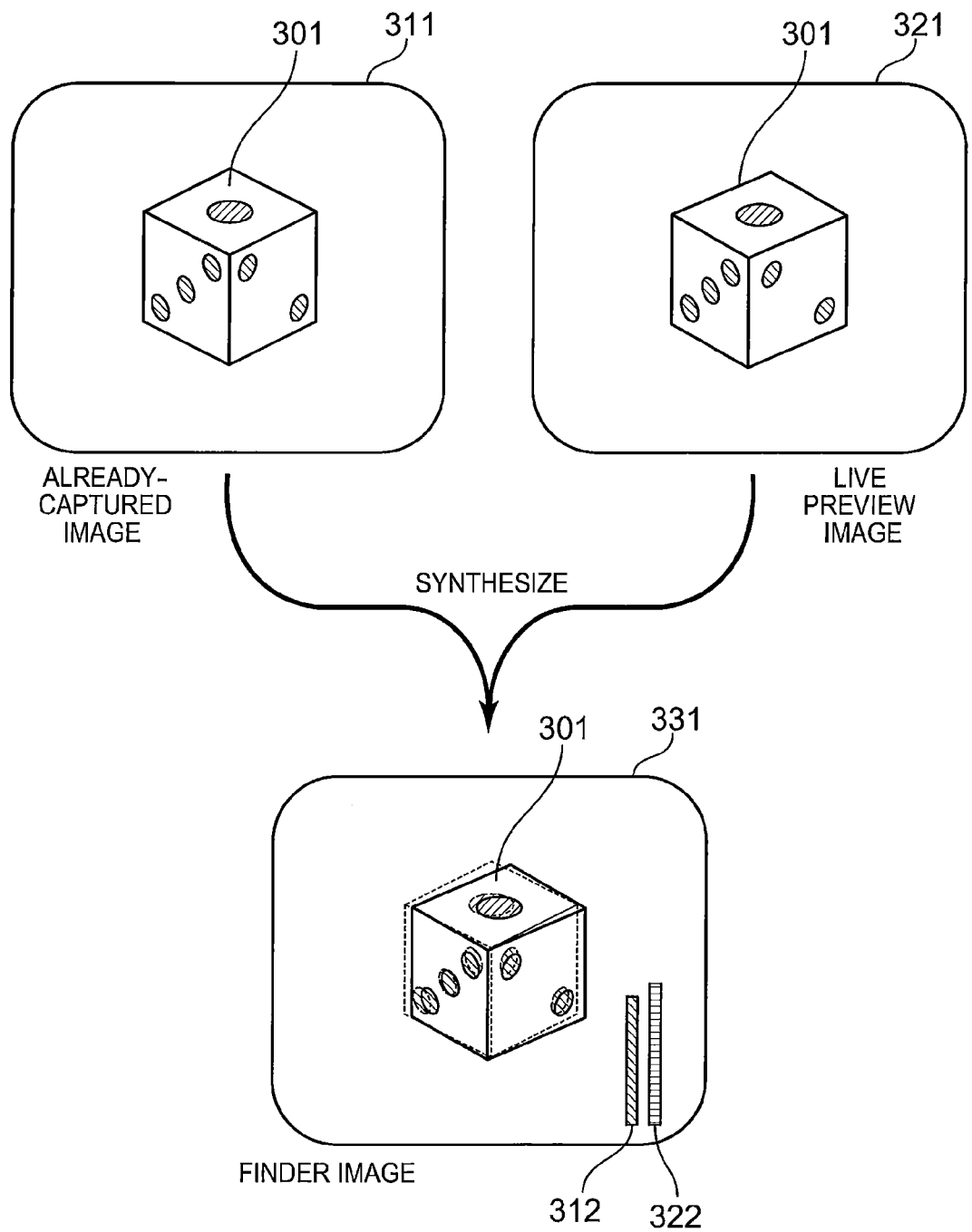
FIG. 3 is an explanatory diagram showing a relationship among a captured image, a live preview image and an image displayed on a finder screen.
Figure 4:
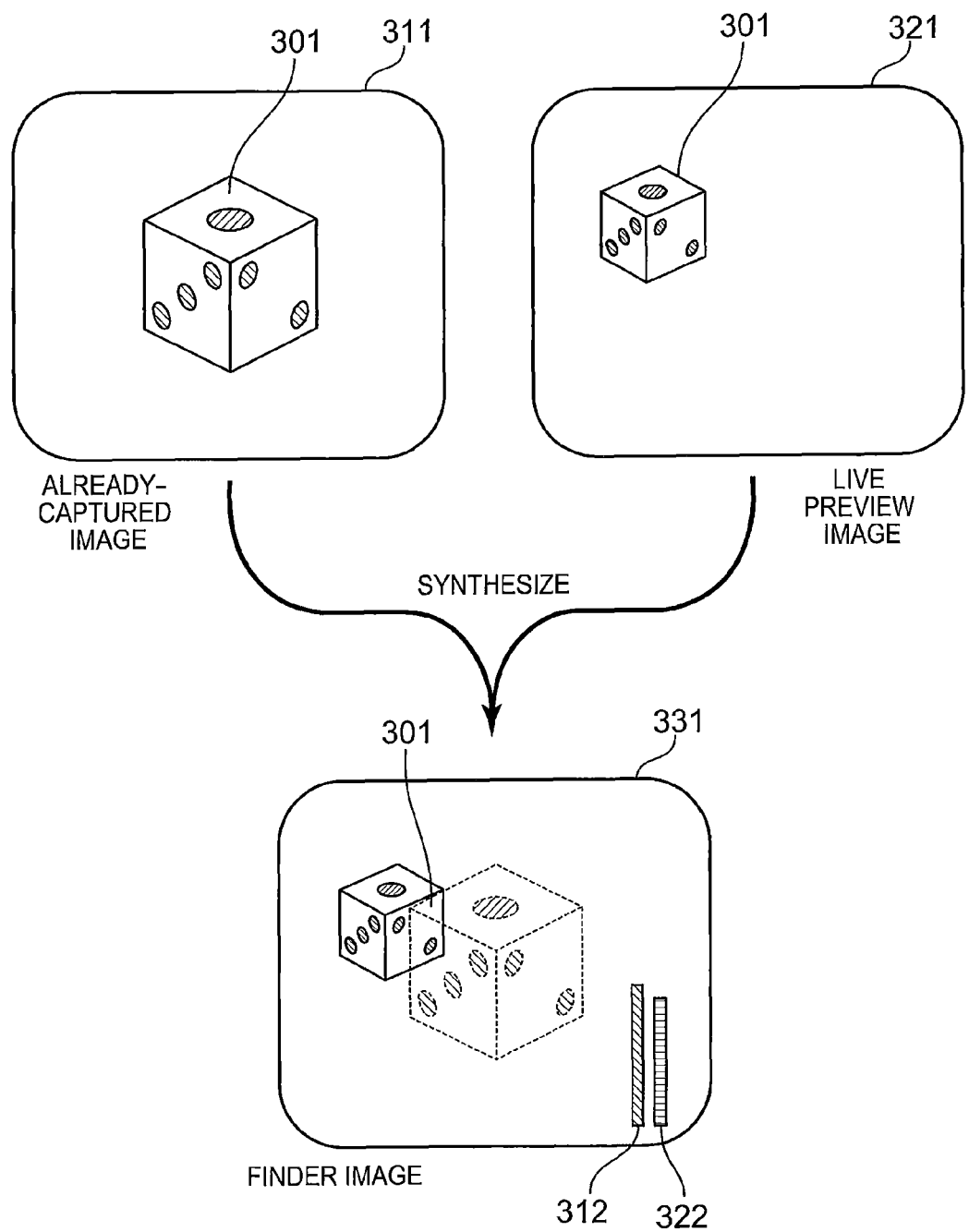
FIG. 4 is an explanatory diagram showing a relationship among a captured image, a live preview image, and an image displayed on a finder screen.

FIGS. 3 and 4 are explanatory diagrams showing a relationship among the already-captured image, the live preview image, and the image displayed on the finder screen. The explanation will be given with reference to these figures. In those figures, a dotted line is used as needed to express a semi-transparent condition.

FIG. 3 shows an already-captured image 311 where a product 301 is disposed at a substantial center, and a live preview image 321 where the product 301 is also disposed at a substantial center. Both images view product 301 from a slightly different angle.

According to a finder image 331 obtained by making the already-captured image 311 semi-transparent and superimposing and synthesizing such an image on the live preview image 321, the two images of the product 301 are displayed in a superimposed manner at the substantially same size. Hence, if the shutter is depressed in this current condition, an error at the time of conversion to the image sequence of entire surroundings can be reduced.

Conversely, in FIG. 4, in the already-picked-up image 311, the product 301 is disposed at a substantial center, but in the live preview image 321, the position of the product 301 and the size thereof largely differ from those of the already-captured image 311.

In this case, according to the finder image 331 obtained by making the already-image 311 semi-transparent and superimposing on and synthesizing with the live preview image 321, the two images of the product 301 hardly overlap with each other. Hence, even if the shutter is depressed in this current condition and a new captured image 311 representing the same appearance as that of the live preview image 321 is obtained, the error at the time of conversion to the image sequence of entire surroundings possibly becomes great.

That is, as shown in FIG. 3, it is appropriate if the person who attempts to capture images adjusts the position of the product imaging device 121 in such a way that the image of the product 301 captured in the past and the image of the product 301 currently viewed have the same size as much as possible but have a slightly different view angle, and gives an instruction input for image-capture.

Even if the person who attempts to capture images moves the product imaging device 121, the position of the product 301 in the already-picked-up image 311 and that of the background do not change, but the position of the product 301 in the live preview image 321 and that of the background change together with the movement of the person who attempts to capture images.

Hence, it is easy for the person who attempts to capture images to distinguish which part of the finder image 331 originates from the already-picked-up image 311 and which part of the finder image originates from the live preview image 321.

Moreover, in order to further clarify the distinction of both images, a scheme can be applied which applies a color filter or a contour extracting filter to the already-picked-up image 311 and synthesizes such an image with the live preview image 321.

Another possible scheme is to alternately display the already-picked-up image 311 and the live preview image 321 on the finder screen. As explained above, it can be distinguished whether the image displayed on the finder screen is the live preview image 321 or the already-picked-up image 311 based on whether the displaying of the finder screen follows the movement of the person who attempts to capture images or is fixed.

Accordingly, the length of time for displaying both images can be set arbitrary. However, in general, the display switch time of both images is set in such a way that the display time of the live preview image 321 is longer than the display time of the already-picked-up image 311.

The image at the time of the beginning of the image-capture of the product 301 is typically applied as the already-picked-up image 311 subjected to synthesis, but it is fine if the person who attempts to capture images can select any images as needed. Moreover, the image captured right before can be applied as the already-picked-up image 311 for synthesis.

The tilt sensor unit 205 senses the tilting of the product imaging device 121, and upon reception of the image-capture instruction, the memory unit 203 stores the image sensed by the image sensor unit 201 in association with the tilting sensed by the tilt sensor unit.

When images are captured while going around the product by a turn, it is typical that the rotational axis is the direction of gravity. In this case, the tilt sensor unit 205 can be configured by an acceleration sensor. Together with such a configuration, the tilting can be detected through the functions of a GPS and a compass, etc.

When the tilting of the product imaging device 121 relative to the axis of the gravitational direction is detected through the acceleration sensor, and the rotation level of the product imaging device 121 around the axis of the gravitational direction is detected through the GPS, and the compass, etc., the tilt sensor unit 205 can detect all tilting of the product imaging device 121 in the directions of three axes. This makes it possible for the user to completely grasp the posture of the product imaging device 121 in the real world. Information on tilting in the directions of three axes are referred by the image conversion device 141 to be discussed later to normalize the already-picked-up image 311 and to obtain the image sequence of entire surroundings.

As explained above, in order to obtain an appropriate image sequence of entire surroundings, it is desirable that the angle from the rotational axis to the product imaging device 121 through the product 301 should be constant, i.e., the tilting relative to the gravity should be constant.

Hence, if auxiliary information including the tilting of the product imaging device 121 currently detected, i.e., information on the tilting of the live preview image 321 and information on the tilting at the time of picking up the already-picked-up image 311 is displayed in the finder image 331, the person who attempts to capture images can capture images of the product 301 at an angle as constant as possible, and thus the error at the time of conversion to the image sequence of entire surroundings can be reduced.

According to this embodiment, as shown in FIGS. 3 and 4, a bar graph 322 that represents the tilting of the live preview image 321 and a bar graph 312 that represents the tilting of the already-picked-up image 311 are displayed in the finder image 331. It is appropriate for the person who attempts to capture images to capture the images while attempting to equalize respective lengths of both bar graphs 312 and 322.

The scheme of indicating the tilting is not limited to the bar graphs 312 and 322, and any graphics representing the level of consistency/inconsistency can be adopted. Moreover, the value of the tilting may be displayed through textual information.

Figure 5:
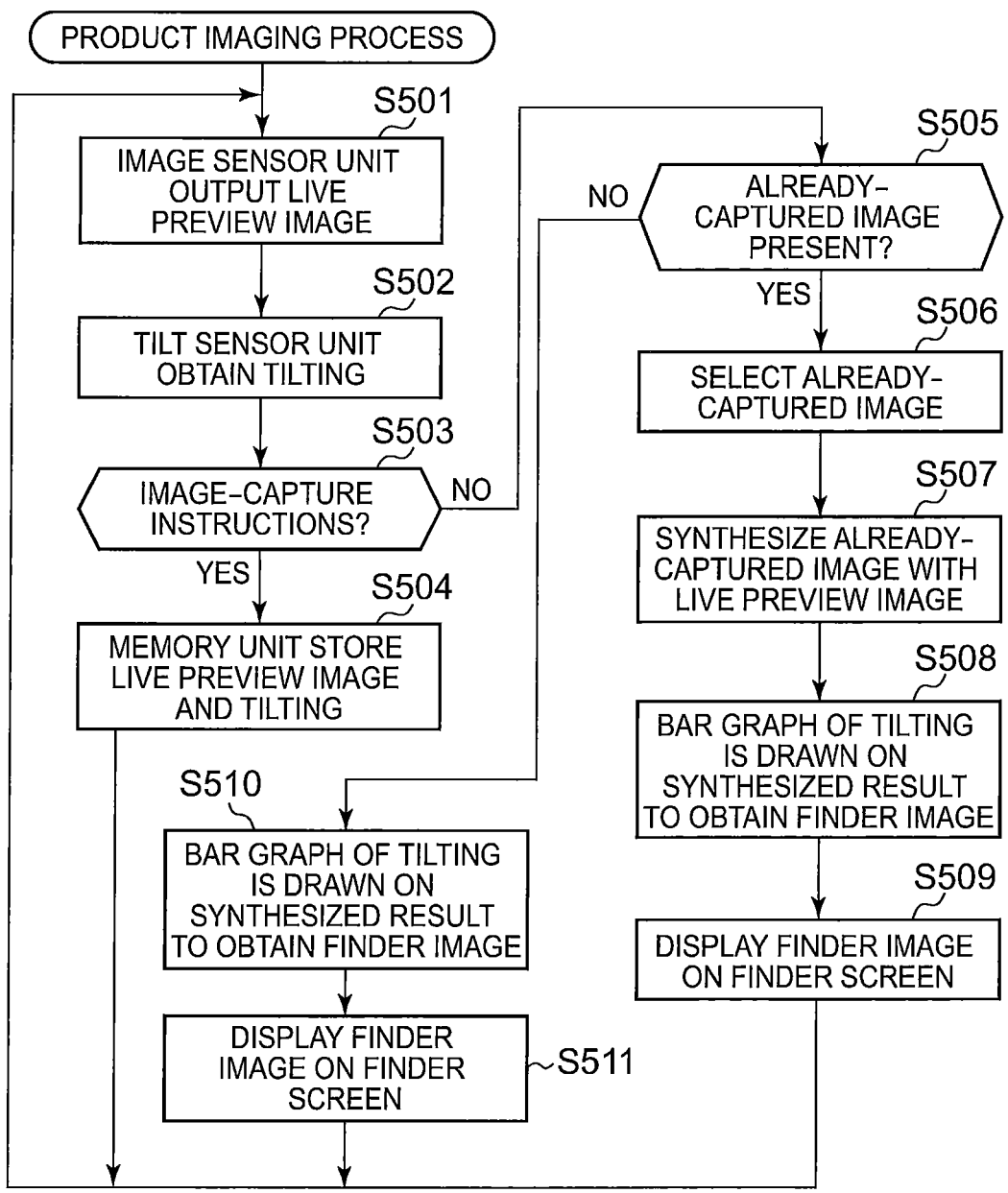
FIG. 5 is a flowchart showing a flow of a control for a product imaging process executed by the product imaging device according to an embodiment of the present invention.

FIG. 5 is a flowchart showing a flow of a control for a product imaging process executed by the product imaging device 121 according to this embodiment. Hereinafter, the explanation will be given with reference to this figure.

This process is started by the user who selects to start picking up images of the product that are the materials of the image sequence of entire surroundings through a digital camera, etc., configuring the product imaging device 121.

First, in the product imaging device 121, the image sensor unit 201 senses incident light from the external world where the product is disposed, and outputs an image representing the result of sensing (step S501). The output image is the live preview image 321.

Next, the tilt sensor unit 205 obtains the current tilting of the product imaging device 121 (step S502).

Subsequently, the instruction receiving unit 202 determines whether or not an image-capture instruction is given from the user (step S503).

When the image-capture instruction has been given from the user (step S503: YES), the memory unit 203 stores the live preview image 321 in association with the tilting detected in the step S502 (step S504). Thereafter, the control returns to the step S501.

Conversely, when no image-capture instruction has been given from the user (step S502: NO), it is checked whether or not there are images stored in the memory unit 203 after the start of this process, i.e., the already-captured images 311 (step S505).

When there are the already-captured images 311 (step S505: YES), any one of the already-captured images 311 is selected (step S506). As explained above, regarding this selection, the image captured at first can be selected, the user can change the image accordingly during the process, or the image captured right before can be selected.

Next, the selected already-captured image 311 is made semi-transparent, and is synthesized with the live preview image 321 (step S507). At this time, as explained above, synthesis may be performed after a color filter or a contour extracting filter is applied to the already-captured image 311. Moreover, as explained above, any image may be selected in the time-sharing manner and the selected image may be taken as the result of synthesis.

Furthermore, the bar graphs 312 and 322 indicating the tilting associated with the selected already-captured image 311 and the current tilting of the product imaging device 121 obtained in the step S502 are drawn over the synthesis result in the step S506, thereby obtaining the finder image 331 (step S508).

Next, the finder display unit 204 displays the finder image 331 on the finder screen configured by a liquid crystal display, etc. (step S509), and the process returns to the step S501.

Conversely, when there is no already-captured image (step S505: NO), the bar graph 322 indicating the current tilting of the product imaging device 121 obtained in the step S502 is drawn over the live preview image 321, thereby obtaining the finder image 331 (step S510).

Next, the finder display unit 204 displays the finder image 331 on the finder screen configured by the liquid crystal display, etc. (step S511), and the process returns to the step S501.

According to an embodiment in which the tilt sensor unit 205 is omitted, the process relating to the tilting is also omitted accordingly.

According to this embodiment, the tilting of the product imaging device 121 relative to the gravity is drawn as the bar graphs 312 and 322 in the finder image 311.

As explained above, according to the image-capture device 121 of this embodiment, the image of the product captured previously and the current live view image of the product are displayed on the finder screen in a superimposed manner, and thus it becomes possible to maintain the distance between the product and the image-capture device 121 at constant as much as possible.

Moreover, according to the embodiment of detecting the tilting, the image-capture device 121 can be moved so as to be rotated at a constant posture as much as possible relative to the predetermined rotational axis.

Hence, the user can easily capture images that can be converted into the image sequence from the entire surroundings of the product with a high quality.

<3. Image Conversion Device>

As explained above, the use of the image-capture device 121 enables the user to successively capture images of the product 301 while moving the image-capture device 121 around the product 301 by a turn and maintaining the distance to the product 301 and the tilting relative to the gravitational direction at constant as much as possible.

When the plurality of already-captured images 311 are obtained through this image-capture technique, those images are normalized to obtain the image sequence of entire surroundings of the product 301. At this time, the image conversion device 141 of this embodiment is used.

The image sequence of entire surroundings of the product 301 is a series of images obtained based on an assumption that the images of the product 301 are successively picked up while rotating the camera around the rotational axis, maintaining the angle from the rotational axis to the camera through the product 301 at constant, and maintaining the distance between the product 301 and the camera at constant with the rotational axis being presumed so as to pass all the way through the product 301.

Hence, it is probable that the plurality of already-captured images 311 picked up by the image-capture device 121 are "the image sequence of entire surroundings with a large error". According to the image-capture device 121, the above-explained angle and distance are maintained at constant as much as possible to capture images of the product 301, but the image-capture by a human inherently causes an error at the time of image-capture.

The image conversion device 141 converts the plurality of already-captured images 311, and obtains the image sequence of entire surroundings with an error as small as possible.

According to this embodiment, unlike Non-Patent Literature 1 that establishes a three-dimensional model of an object for image-capture, the image sequence of entire surroundings can be obtained through simple calculations. This will be explained below in more detail.

Figure 6:
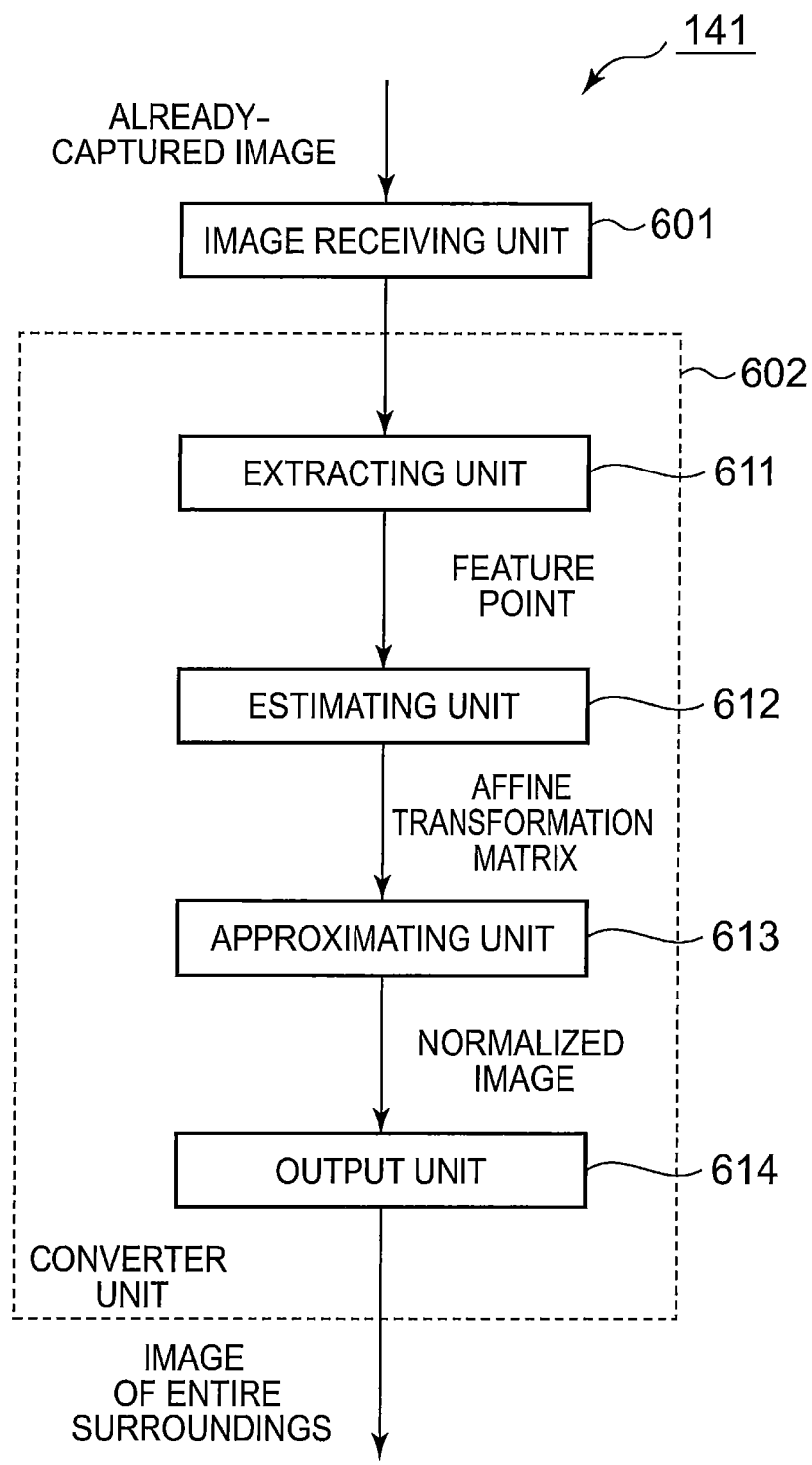
FIG. 6 is an explanatory diagram showing a general configuration of an image conversion device according to an embodiment of the present invention.

FIG. 6 is an explanatory diagram showing a general configuration of the image conversion device 141 according to this embodiment. The explanation will be given with reference to this figure.

The image conversion device 141 according to this embodiment includes an image receiving unit 601, and a converter unit 602.

The image receiving unit 601 receives the plurality of already-captured images 311 picked up and stored by the product imaging device 121 from the surroundings of the product.

When the image conversion device 141 is configured by a Web server, etc., the person who attempts to capture images uploads the already-captured images 311 picked up by such a person via the Internet, etc. The image receiving unit 601 receives this uploading.

An embodiment may be carried out in which the product imaging device 121 automatically transmits the already-captured images 311 to the image conversion device 141. According to this embodiment, the product imaging device 121 automatically transmits the already-captured images 311 every time a predetermined number of already-captured images 311 are stored or no image-capture is performed for a predetermined time. This embodiment is especially suitable when the product imaging device 121 is realized by a portable computer, such as a PDA (Personal Data Assistant) or a smart phone which runs a predetermined program.

When the image-capture device 121 is configured by a digital camera, etc., and the image conversion device 141 is configured by a personal computer, etc., loading/unloading of a memory card between those devices enables the transfer of the already-captured images 311.

Conversely, the converter unit 602 converts the received plural already-captured images 311 into the image sequence of entire surroundings of the product 301.

The converter unit 602 of this embodiment further includes an extracting unit 611, an estimating unit 612, an approximating unit 613, and an output unit 614.

The extracting unit 611 obtains the already-captured images 311 two by two successively. Next, the extracting unit extracts corresponding feature points from the two obtained already-captured images 311. At this time, various image recognition algorithms can be applied.

When the corresponding feature points are obtained, based on the locations of the feature points in the two already-captured images 311, the positions and directions of the product imaging device 121 when the two already-captured images 311 were picked up are estimated, and an affine transformation matrix for normalizing each of the two already-captured images 311 is obtained. The affine transformation applied in this process includes perspective transformation through one-point perspective in addition to scaling, rotation, and oblique transformation. Hence, when the matrix is expressed, a homogeneous coordinate is used as needed.

In the following explanation, in order to facilitate understanding through a simplification of notation, as far as a confusion does not occur, an original matrix, vector and the matrix, vector having the dimension of a constant increased and added to be the homogeneous coordinate are denoted by the same symbol in some cases.

Next, the approximating unit 613 applies affine transformation to the already-captured images 311 based on the affine transformation matrixes obtained for each of the two already-captured images 311 to normalize those images. The normalized image approximates the image that must be included in the image sequence of entire surroundings.

The output unit 614 outputs the obtained two normalized images and how much the angle of image-capture differs around the rotational axis between the two images.

The flow of a control for an image conversion process executed by the image conversion device 141 will be explained below in more detail.

Figure 7:
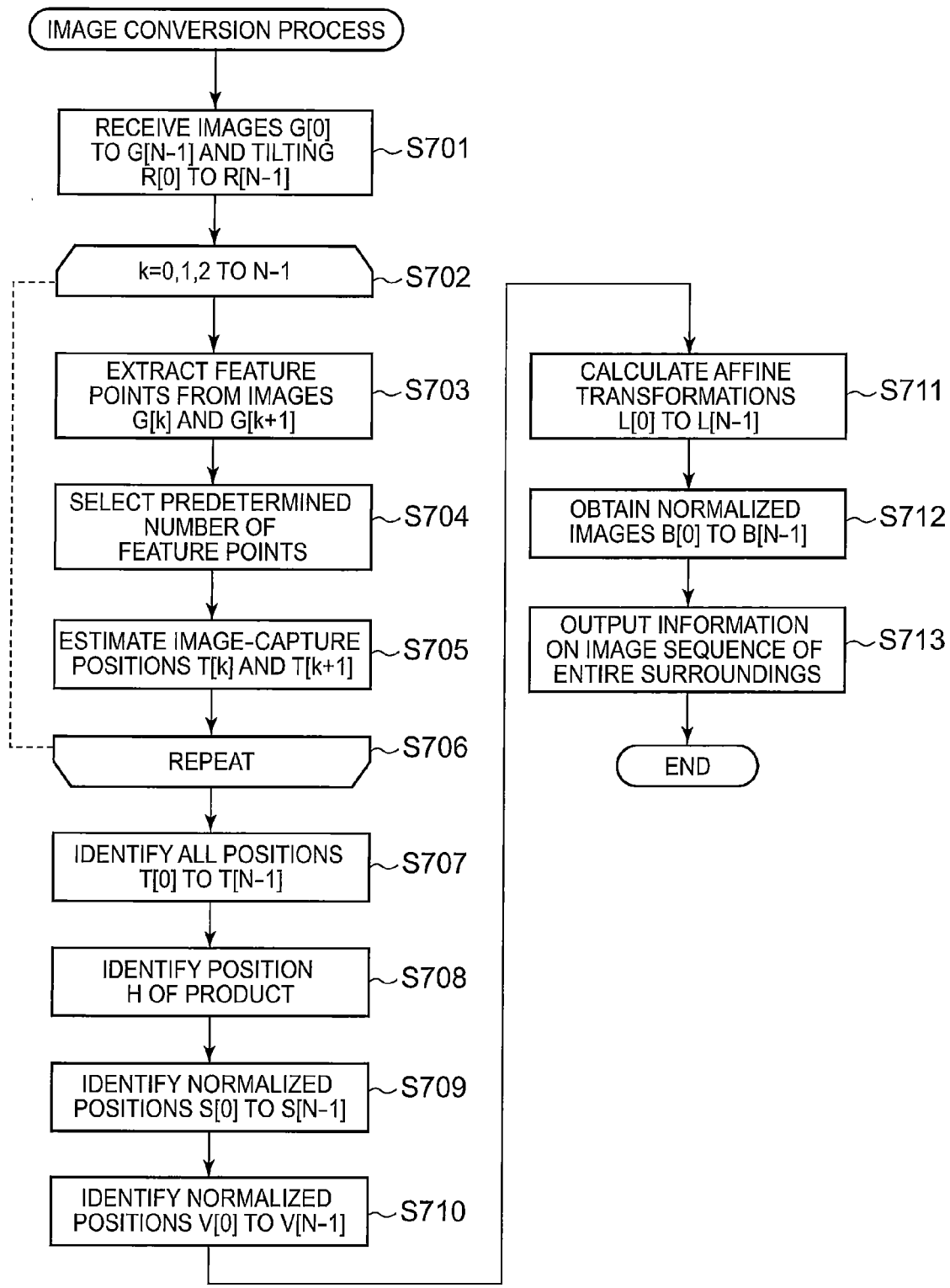
FIG. 7 is a flowchart showing a flow of a control for an image conversion process executed by the image conversion device according to the embodiment.

FIG. 7 is a flowchart showing a flow of a control for the image conversion process executed by the image conversion device 141 according to this embodiment. The explanation will be given with reference to this figure.

First, the image receiving unit 601 receives the plurality of already-captured images 311 picked up and stored by the product imaging device 121 and the tilting associated with each already-captured image 311 (step S701). Hereinafter, in order to facilitate understanding, it is presumed that the number of already-captured images 311 is N, and each already-captured image will be expressed as G[0], G[1], . . . and G[N−1]. Moreover, the tilting when each image G[0], G[1], . . . and G[N−1] was picked up will be expressed as R[0], R[1], . . . and R[N−1].

It is presumed below that the index expressed by the square brackets is expressed by the coset of N. That is, when the integer of the index is negative and is equal to or greater than N, a remainder obtained by dividing such an integer by N is utilized as the value of the index. For example, the tilting R[N] has the same meaning as that of the tilting R[0], and the image G[−1] has the same meaning as that of the image R[N−1].

The tilting R[0], R[1], . . . and R[N−1] is information for determining the direction of each coordinate axis of the camera coordinate system fixed to the product imaging device 121. Hence, the degree of freedom for each tilting R[0], R[1], . . . and R[N−1] is 6.

However, it is typical to express by a 3×3 matrix having unit vectors representing directions of respective coordinate axes arranged.

Next, an integer k is changed between 0 to N to repeat the following process (step S702).

That is, the extracting unit 611 extracts corresponding feature points from the image G[k] and the image G[k+1] (step S703).

Next, the estimating unit 612 selects any three sets among the sets of extracted feature points (step S704). How to select the three sets is optional, but when selection is made such that the distance between the selected corresponding points is great in the image G[k] and such a distance between the selected corresponding points is also great in the image G[k+1], an error can be suppressed. Any three feature points from the feature points close to the top side, the bottom side, the left-side center, and the right-side center of the product can be selected.

In the following explanation, the three feature points are referred to as P, Q, and W, respectively. Positions where those feature points are drawn in the image G[k] are expressed as p[k], q[k] and w[k], and positions where those feature points are drawn in the image G[k+1] are expressed as p[k+1], q[k+1], and w[k+1].

The estimating unit 612 estimates the followings (step S705):

(x) The position T[k] of the product imaging device 121 when the image G[k] was picked up; and (y) The position T[k+1] of the product imaging device 121 when the image G[k+1] was picked up, from:

(1) Positions p[k] and p[k+1] of the feature point p in the images G[k] and G[k+1];

(2) Positions q[k] and q[k+1] of the feature point Q in the images G[k] and G[k+1];

(3) Positions w[k] and w[k+1] of the feature point W in the images G[k] and G[k+1];

(4) The tilting R[k] of the product imaging device 121 when the image G[k] was picked up; and (5) The tilting R[k+1] of the product imaging device 121 when the image G[k+1] was picked up.

The detail of this estimating algorithm will be explained below in more detail.

In general, image-capture through a camera utilizes a coordinate transformation between a world coordinate system fixed to the real world and a camera coordinate system fixed to the camera. The world coordinate system and the camera coordinate system both have three coordinate axes orthogonal to one another.

Directional vectors of the three coordinate axes in the camera coordinate system will be denoted as rx, ry, and rz, respectively (Formula 1 to Formula 3).

$$rx = \begin{bmatrix} rx1 \\ rx2 \\ rx3 \end{bmatrix} \quad \text{[Formula 1]}$$

$$ry = \begin{bmatrix} ry1 \\ ry2 \\ ry3 \end{bmatrix} \quad \text{[Formula 2]}$$

$$rz = \begin{bmatrix} rz1 \\ rz2 \\ rz3 \end{bmatrix} \quad \text{[Formula 3]}$$

Respective values rx1, rx2, . . . and rz3 are all coordinate values in the world coordinate system, and represent the vectors rx, ry, and rz.

Moreover, a positional vector at the origin of the camera coordinate system relative to the origin of the world coordinate system will be denoted as T (formula 4).

$$T = \begin{bmatrix} t1 \\ t2 \\ t3 \end{bmatrix} \quad \text{[Formula 4]}$$

Values t1, t2, and t3 are coordinate values of the positional vector T in the world coordinate system.

Under such conditions, it is presumed that a vector pc arranging coordinate values of a point P in the camera coordinate system is expressed as follow (formula 5).

$$pc = \begin{bmatrix} pc1 \\ pc2 \\ pc3 \end{bmatrix} \quad \text{[Formula 5]}$$

In this case, a vector pw arranging coordinate values of the point P in the world coordinate system can be expressed as follow (formula 6).

$$pw = \begin{bmatrix} pw1 \\ pw2 \\ pw3 \end{bmatrix} \quad \text{[Formula 6]}$$

$$= [\, rx \ \ ry \ \ rz\,] pc + T$$

$$= Rpc + T$$

A matrix R is a matrix expressing the direction of the coordinate axis of the camera coordinate system. That is, this matrix can be obtained from the detection results by the gravity sensor and the compass, etc., of the tilt sensor unit 205 when image-capture was performed through the product imaging device 121.

According to this formula, a parallel movement is expressed by addition, but when a homogeneous coordinate expression is used, it can be expressed only by the multiplication of the matrix (formula 7).

$$\begin{bmatrix} pw \\ 1 \end{bmatrix} = \begin{bmatrix} R & T \\ 0^t & 1 \end{bmatrix} \begin{bmatrix} pc \\ 1 \end{bmatrix} = D \begin{bmatrix} pc \\ 1 \end{bmatrix},$$

$$\begin{bmatrix} pc \\ 1 \end{bmatrix} = D^{-1} \begin{bmatrix} pw \\ 1 \end{bmatrix} = \begin{bmatrix} R^t & -R^t T \\ 0^t & 1 \end{bmatrix} \begin{bmatrix} pw \\ 1 \end{bmatrix}$$

[Formula 7]

In the above formula, $R^t$ means a transposed matrix of the matrix R. Since R is a unitary matrix, $R^{-1}=R^t$ is satisfied. Moreover, $0^t$ is a three-dimensional lateral zero vector.

It is presumed that there is a projection plane orthogonal to the z axis of the camera coordinate system and distant from the origin by a focal distance f. A result projected on the projection plane corresponds to the already-captured image 311. Hence, a vector u arranging coordinate values in a two-dimensional coordinate system fixed to the projection plane is expressed as follow (formula 8).

$$pu = \begin{bmatrix} pu1 \\ pu2 \end{bmatrix}$$

[Formula 8]

In this case, the location where the point P is projected on the projection plane can be expressed as follow (formula 9).

$$pu1 = f\frac{pc1}{pc3},$$

$$pu2 = f\frac{pc2}{pc3}$$

[Formula 9]

This will be rewritten as follow (formula 10).

$$pc3 \begin{bmatrix} pu1 \\ pu2 \\ 1 \end{bmatrix} = \begin{bmatrix} f & 0 & 0 & 0 \\ 0 & f & 0 & 0 \\ 0 & 0 & 1 & 0 \end{bmatrix} \begin{bmatrix} pc1 \\ pc2 \\ pc3 \\ 1 \end{bmatrix},$$

$$pc3 \begin{bmatrix} pu \\ 1 \end{bmatrix} = A \begin{bmatrix} pc \\ 1 \end{bmatrix}$$

[Formula 10]

A condition in which two vectors are in a proportional condition by a non-zero proportional constant will be denoted by ≡ (formula 11).

$$\begin{bmatrix} pu \\ 1 \end{bmatrix} \equiv A \begin{bmatrix} pc \\ 1 \end{bmatrix}$$

[Formula 11]

When the image of the point P having coordinates pw in the world coordinate system is picked up by the product imaging device 121 at the position T and the tilting R, the coordinates pu where such a point is projected on the already-captured image 311 can be expressed as follow (formula 12).

$$\begin{bmatrix} pu \\ 1 \end{bmatrix} \equiv A \begin{bmatrix} R^t & -R^t T \\ 0^t & 1 \end{bmatrix} \begin{bmatrix} pw \\ 1 \end{bmatrix} = M \begin{bmatrix} pw \\ 1 \end{bmatrix}$$

[Formula 12]

In the above formula, M is a matrix of 3×4.

This projection plane is based on an assumption of an ideal pin-hole camera, and is fixed to the camera coordinate system. The first axis of the two-dimensional coordinate system is parallel to the x axis, and the second axis of the two-dimensional coordinate system is parallel to the y axis.

When a general projection is carried out which does not always satisfy this condition, a matrix A can be used depending on a situation.

When, for example, the projection plane and the z axis of the camera coordinate system have an angle ψ, the matrix A can be expressed as follow using appropriate constants k1, k2, uc1, and uc2 (formula 13).

$$A = \begin{bmatrix} fk1 & -fk1\cot\psi & uc1 & 0 \\ 0 & fk2/\sin\psi & uc2 & 0 \\ 0 & 0 & 1 & 0 \end{bmatrix}$$

[Formula 13]

In a case in which, for example, a fish-eye lens is used, an affine transformation matrix M similar to the above-explained matrix can be obtained by defining the matrix A appropriately.

An explanation will be given of a technique of obtaining the image-capture positions T[k] and T[k+1] based on the above-explained image-capture relationship. Those positions each have three elements, and thus the number of unknowns is six at total.

First, an affine transformation matrix to the image-capture position T[k] and the tilting R[k] is defined as M[k] and an affine transformation matrix to the image-capture position T[k+1] and the tilting R[k+1] is defined as M[k+1]. In this case, the following relationship is satisfied (formula 14).

$$M[k]^{-1} \begin{bmatrix} p[k] \\ 1 \end{bmatrix} \equiv M[k+1]^{-1} \begin{bmatrix} p[k+1] \\ 1 \end{bmatrix},$$

$$M[k]^{-1} \begin{bmatrix} q[k] \\ 1 \end{bmatrix} \equiv M[k+1]^{-1} \begin{bmatrix} q[k+1] \\ 1 \end{bmatrix},$$

$$M[k]^{-1} \begin{bmatrix} w[k] \\ 1 \end{bmatrix} \equiv M[k+1]^{-1} \begin{bmatrix} w[k+1] \\ 1 \end{bmatrix}$$

[Formula 14]

However, since M[k] and M[k+1] are each a matrix of 3×4, $M[k]^{-1}$ and $M[k+1]^{-1}$ are generalized inverse matrixes for M[k] and M[k+1], respectively. The generalized inverse matrix is sometimes called a "Moore and Penrose pseudo inverse matrix".

The number of unknowns is nine at total which is six coordinate values of the image-capture positions T[k] and T[k+1] and three proportional coefficients of the left side and the right side in each condition [≡].

Conversely, the matrix equation has three three-dimensional unknowns, and thus the total number thereof is nine. Hence, all unknowns can be obtained by solving those simultaneous equations.

When solving the simultaneous equations, it is appropriate if a solution is obtained through a formula manipulation based on a symbol manipulation, or various approximate solvers may be applied. For example, a technique can be applied which gives appropriate initial values to T[k], T[k+1], and the proportional constant and obtains a solution through the steepest descent method.

In addition, when the number of feature points increases, the number of simultaneous equations can be further increased. In this case, those unknowns can be obtained by performing maximum likelihood estimation so as to minimize the square sum of an error obtained by subtracting the right side of each simultaneous equation from the left side thereof.

As explained above, the image-capture positions T[k] and T[k+1] can be identified through the selection of the three corresponding feature points in the image. On the other hand, if the image-capture positions T[k] and T[k+1] are identified, the affine transformation matrixes M[k] and M[k+1] in the perspective projection by one-point perspective can be obtained.

When those processes are repeated (S706), respective estimated values of T[0], T[1], T[2], . . . and T[N−1] can be obtained through the step S705 (x), and 10 respective estimated values of T[1], T[2], . . . T[N−1], and T[0] can be obtained through the step S705 (y).

Hence, by selecting either one of those or by obtaining an average of those, the positions T[0], T[1], T[2], . . . and T[N−1] of the product imaging device 121 can be identified (step S707).

Moreover, a position H of the product 301 in the real world can be identified through the following technique (step S708).

That is, for each of the integers k=0, 1, 2, . . . and N−1, the optical axis direction of the image-capture is obtained from the tilting R[k]. Next, straight lines which pass through the image-capture position T[k] and run toward the optical axis direction are simulated. Those N number of straight lines must pass through the position H of the product 301 or the neighborhood thereof.

Hence, the position H of the product 301 can be obtained through the least square technique that minimizes the square sum of the distance between the position H of the product 301 and the N number of straight lines.

When the above-explained image-capture is carried out through the product imaging device 121, the image-capture positions T[0], T[1], T[2], . . . and T[N−1] identified are possibly positioned circularly around the center axis that passes through the position H of the product 301. Moreover, when a human captures images of the product, it is not always true that the images are captured right from beside the product, and images are often captured from obliquely above.

That is, in an ideal case, the estimated image-capture positions T[0], T[1], T[2], . . . and T[N−1] are arranged over the bottom face of a circular conic having the position H as a vertex. Moreover, when images are captured from right beside, the estimated image-capture positions T[0], T[1], T[2], . . . and T[N−1] are arranged over the circumference having the position H as a center.

However, image-capture is carried out by a human, which frequently causes errors. Accordingly, by normalizing the image-capture positions T[0], T[1], T[2], . . . and T[N−1], normalized positions S[0], S[1], S[2], . . . and S[N−1] are identified over a precise circumference that is the bottom of a true circular conic having the position H as a center (step S709). When the vertex angle of this true circular conic is set to be 180 degrees, it is possible to cope with a case in which the normalized positions S[0], S[1], S[2], . . . and S[N−1] are arranged over the precise circumference around the position H.

For this identification, more specifically, the following calculations are carried out.

First, distances of respective image-capture positions T[0], T[1], T[2], . . . and T[N−1] distant from the position H are made to be equal to one another. That is, for each of the integers k=0, 1, 2, . . . and N−1 a scaling coefficient sc[k] for making the distance equal and a position U[k]=T[k]+sc[k](T[k]−H)/|T[k]−H| are calculated so as to make sc[0], sc[1], sc[2], . . . and sc[N−1] as small as possible.

That is, the position U[k] is located over a straight line that interconnects the position H of the product 301 with the image-capture position T[k], and the position U[k] and the image-capture position T[k] are distant from each other by sc[k]. At this time, minimization of sc[0], sc[1], sc[2], . . . and sc[N−1] is taken as a constraint condition.

In the simplest way, an average distance D to respective image-capture positions T[0], T[1], T[2], . . . and T[N−1] is obtained from $$D=\Sigma_{k=0}^{N-1}|T[k]-H|/N,$$ and when it is set to be $$sc[k]=D-|T[k]-H|,$$

each |U[k]−H| becomes equal to the distance D.

Next, a position J of the center of the circumference that is the bottom of a circular conic and a radius r thereof are calculated. It is simplest if the center position J of the circumference is taken as the weighted center of the position U[k] like $$J=\Sigma_{k=0}^{N-1}U[k]/N.$$

Next, it is simplest if the radius r of the circumference is taken as the average of the distances between the position J and respective U[k] like $$r=\Sigma_{k=0}^{N-1}|U[k]-J|/N.$$

The position of the product 301 and the trajectory of the circumference when the image sequence of entire surroundings of the product 301 are picked up are defined in this manner. This circumference has a straight line interconnecting the position H with the position J as a rotational axis.

Hence, for each k=0, 1, 2, . . . and N−1, a position S[k] over the circumference relative to the image-capture position T[k] is identified next. The position S[k] obtained here corresponds to a virtual image-capture position obtained by normalizing the image-capture position T[k].

The simplest technique is to take the closest position to the image-capture position T[k] over the circumference as S[k].

First, from a vector H−J and a vector T[k]−J, a vector OP[k]=((H−J)×(T[k]−J))×(H−J) is calculated.

The vector (H−J×T[k]−J) is orthogonal to both vector H−J and vector T[k]−J.

Accordingly, the vector OP[k]=((H−J)×(T[k]−J))×(H−J) is parallel to a plane formed by the vector H−J and the vector T[k]−J, and is orthogonal to the vector H−J.

That is, a half line running to a leg part extended from T[k] relative to the plane formed by the circumference from the position J and the vector OP[k] run in the same direction in parallel with each other.

Hence, the normalized position S[k] of a point over the circumference and closest to the image-capture position T[k] can be obtained from:

$$S[k]=J+r\ OP[k]/|OP[k]|.$$

As explained above, the normalized positions S[0], S[1], . . . and S[N−1] are arranged over the predetermined circumference. Accordingly, it is also possible to obtain how much each of S[0], S[1], . . . and S[N−1] rotates relative to the center J over the circumference as viewed from S[0].

That is, it is presumed that respective rotational angles of the normalized positions S[0], S[1], . . . and S[N−1] are θ[0], θ[1], . . . and θ[N−1]. For each of the integers k=0, 1, . . . and N−1, θ[k] is an angle of a vector S[k]−J relative to a vector S[0]−J. That is, each rotational angle θ[k] can be obtained from:

$$\cos(\theta[k]) = \langle\langle S[0]-J, S[k]-J \rangle\rangle / (|S[0]-J| \cdot |S[k]-J|),$$

$$\sin(\theta[k]) = |(S[0]-J) \times (S[k]-J)| / (|S[0]-J| \cdot |S[k]-J|).$$

$\langle\langle x, y \rangle\rangle$ is an inner product of a vector x and a vector y.

If it is presumed that θ[k] obtained in this manner are arranged in an ascending order like $0 = \theta[0] \le \theta[1] \le \theta[2] \le \ldots \le \theta[N-2] < 2\pi$, no generality is lost. When, for a certain k, θ[k]>θ[k+1] is satisfied and the order is switched, (a) The image G[k], the tilting R[k], the image-capture position T[k], the normalized position S[k], and the rotational angle θ[k] and (b) The image G[k+1], the tilting R[k+1], the image-capture position T[k+1], the normalized position S[k+1], and the rotational angle θ[k+1] can be interchanged as a whole.

Next, for each of the integers k=0, 1, 2, . . . and N−1, a tilting V[k] of a virtual image-capture at a virtualized position S[k] is calculated (step S710). More specifically, it is typical that a vector H−S[k] directed to the position H of the product 301 from the virtualized position S[k] is taken as an optical direction (z axis) of the image-capture, a direction of the tangent line of the circumference at the virtualized position S[k] is taken as the horizontal direction (x axis) of the image-capture, and a component of a vector J−S[k] directed to the center position J of the circumference from the virtualized position S[k] and orthogonal to H−S[k] is taken as a vertical direction (y axis) of the image-capture. By setting those two directions, the six degrees of freedom for the camera coordinate system are determined. The tilting V[k] of the image-capture in the virtualized position S[k] is automatically determined.

Next, as explained above, the point P disposed at a position pw in the real space is projected to a position pu of the image G[k] satisfying the following condition when picked up at the image-capture position T[k] at a direction R[k] (formula 15).

$$\begin{bmatrix} pu \\ 1 \end{bmatrix} \equiv M[k] \begin{bmatrix} pw \\ 1 \end{bmatrix}$$ [Formula 15]

The proportional constant of this formula is, as is also expressed in the (formula 10), the coordinate value pc3 of the point P along the z axis in the camera coordinate system, i.e., the optical axis of the image-capture direction.

Hence, when the product imaging device 121 captures images of the product 301 having the point P disposed on a surface, the distance between the product 301 and the product imaging device 121 can be taken as an approximated value of pc3 (formula 16) like $$d[k] = |T[k]-H|.$$

$$d[k] \begin{bmatrix} pu \\ 1 \end{bmatrix} \approx M[k] \begin{bmatrix} pw \\ 1 \end{bmatrix}$$ [Formula 16]

Conversely, a position pw of the point P projected at the position pu in the image G[k] in the real space can be obtained through the following approximate calculation (formula 17).

$$\begin{bmatrix} pw \\ 1 \end{bmatrix} \approx \frac{1}{d[k]} M[k]^{-1} \begin{bmatrix} pu \\ 1 \end{bmatrix}$$ [Formula 17]

Likewise, it is presumed that the point P disposed at the position pc in the real world is projected at a position pu' in a normalized image B[k] at the rotational angle θ[k].

The position where the normalized image B[k] is picked up is the bottom of the true circular conic, and the distance d=|S[k]−H| between each normalized position S[k] and a vertex H is constant regardless of k, and the following relationship is satisfied (formula 18).

$$d \begin{bmatrix} pu' \\ 1 \end{bmatrix} \approx L[k] \begin{bmatrix} pw \\ 1 \end{bmatrix},$$ [Formula 18]

$$\begin{bmatrix} pw \\ 1 \end{bmatrix} \approx d L[k]^{-1} \begin{bmatrix} pu' \\ 1 \end{bmatrix}$$

That is, the position pu' in the normalized image B[k] corresponds to the position pu in the already-captured image G[k], but the position pu can be approximated as follow (formula 19).

$$\begin{bmatrix} pu \\ 1 \end{bmatrix} \approx \frac{d}{d[k]} M[k] L[k]^{-1} \begin{bmatrix} pu' \\ 1 \end{bmatrix}$$ [Formula 19]

Accordingly, for each position in the normalized image B[k], (1) the position of a pixel of the already-captured image G[k] is obtained from the above-explained relationship, (2) a pixel value of the obtained position in the already-captured image G[k] is obtained, and (3) the obtained pixel value is drawn as the pixel value of that position in the normalized image B[k], thereby obtaining the normalized image B[k].

Through such an algorithm, the approximating unit 613 calculates, for each of the integers k=0, 1, 2, . . . and N−1, an affine transformation matrix L[k] that transforms the position in the real world into the position in the image when image-capture is carried out at the virtualized position S[k] at a tilting V[k] (step S711).

Next, transformation by an affine transformation matrix $$(d/d[k]) M[k] L[k]^{-1}$$

is performed on the image G[k], and the normalized image B[k] relative to the rotational angle θ[k] included in the image sequence of the entire viewable exterior surface is obtained (step S712).

When the image sequence of the entire viewable exterior surface having the normalized images B[0], B[1], B[2], . . . and B[N−1] arranged and the rotational angles θ[0], θ[1], θ[2], . . . and θ[N−1] relative to respective normalized images are obtained in this manner, the output unit 614 outputs those as information on the image sequence of the entire viewable exterior surface (step S713), and terminates the process.

It is desirable in the step S713 to output, as a part of the information on the image sequence of the entire viewable exterior surface, the affine transformation matrixes 10 (1/d) L[0], (1/d)L[1], (1/d)L[2], . . . and (1/d)L[N−1] that transform the positions in the real world into the positions in the normalized images.

Pieces of information on the output image sequence of the entire viewable exterior surface, the rotational angle, and the affine transformation matrix are typically stored in the hard disk, etc., of the server device, but can be downloaded to the smart phone, the cellular phone, and the personal computer, etc., from such a server device.

According to the above explanation, images of the product 301 are picked up while the product imaging device 121 is moving on the substantial circumference of the bottom of the substantial circular conic having the product 301 as the vertex, thereby obtaining the already-captured images.

Next, the error contained in the image-capture results are corrected, and the normalized images that are possibly obtained when images of the product 301 are picked up while the product imaging device 121 is moving around the true circumference of the bottom of the true circular conic having the product 301 as the vertex are obtained as a result.

In order to simplify the process, it is fine to presume that the product imaging device 121 moves around the substantial circumference around the product 301, and the normalized image represents an appearance of the product as viewed from the true circumference around the product 301. According to this scheme, the constraint condition is remarkably simplified in comparison with the above explanation, and it is expected that the calculation speed further increases.

In addition, the position of the product 301 and the shape of the circular conic may be defined through various maximum likelihood estimation techniques.

In the following explanation, a technique of obtaining the image-capture positions, T[k] and T[k+1], the tilting R[k] and R[k+1], and the affine transformation matrixes M[k] and M[k+1] through a further simpler approximation calculation when the product imaging device 121 of this embodiment is used will be explained.

As explained above, in the transformation from the (formula 10) to the (formula 11), the proportional constant pc3 is eliminated. The proportional constant pc3 represents the coordinate value of a point of an image-capture object in the optical axis of the image-capture direction, i.e., a depth of the point of the image-capture object from the camera.

Conversely, when the product imaging device 121 of this embodiment is used, image-capture is performed in such a way that the size of the product 301 becomes substantially constant throughout the already-captured images. Accordingly, it can be thought that the depth to the product 301 is substantially equal as viewed from any image-capture positions.

In this case, the proportional relationship "≡" in the (formula 14) can be replaced with the equal sign "=". Then, it becomes unnecessary to obtain the proportional constant that is unknown.

Hence, provided that the depth to the product 301 being equal, from two feature positions of points p and q, the image-capture positions T[k] and T[k+1], the tilting R[k] and R[k+1], and the affine transformation matrixes M[k] and M[k+1] can be obtained through the following simultaneous equations.

$$M[k]^{-1}\begin{bmatrix}p[k]\\1\end{bmatrix}=M[k+1]^{-1}\begin{bmatrix}p[k+1]\\1\end{bmatrix},$$

$$M[k]^{-1}\begin{bmatrix}q[k]\\1\end{bmatrix}=M[k+1]^{-1}\begin{bmatrix}q[k+1]\\1\end{bmatrix}$$

[Formula 20]

That is, the number of unknowns is six that are the coordinate values of the image-capture positions T[k] and T[k+1], and there are two three-dimension matrix equations, and the total number is six. Accordingly, the image-capture positions T[k] and T[k+1] can be obtained by calculation.

Regarding the specific calculation, the similar techniques as the above-explained embodiment can be applied.

The more the number of feature points to be referred to obtain the image-capture positions increases, the more the calculation load increases, but calculation precision increases. Moreover, when the number of feature points is set to be equal to or greater than three, the image-capture positions T[k] and T[k+1], the tilting R[k] and R[k+1], and the affine transformation matrixes M[k] and M[k+1] can be obtained without any specific precondition for the position of the product 301 relative to each image-capture position T[k].

Conversely, like this embodiment, when it can be thought that the distance between the product 301 and each image-capture position T[k] is substantially equal, if the number of feature points is set to be two, the calculation load can be reduced, while at the same time, the image-capture positions T[k] and T[k+1], the tilting R[k] and R[k+1], and the affine transformation matrixes M[k] and M[k+1] can be highly precisely obtained although approximation is applied.

<4. Image Processing Device>

The normalized images B[0], B[1], B[2], . . . and B[N−1] included in the image sequence of the entire viewable exterior surface are associated with the rotational angles θ[0], θ[1], θ[2], . . . and θ[N−1] around the product 301, respectively. As explained above, if a condition

0=θ[0]≤θ[1]≤θ[2]≤ . . . ≤θ[N−1]<2π is set, no generality is lost.

When an arbitrary rotational angle φ is given from the user, the image processing device 161 has a function of interpolating the image of the product 301 as viewed from the position corresponding to the rotational angle φ using the above-explained information, and of presenting the interpolated image to the user. The simplest interpolation technique is as follow.

As explained above, from the rotational angle φ in the bottom of the circular conic, a position S(φ) over the circumference of the bottom of the circular conic, and a tilting V(φ) of the image-capture at this position can be uniquely obtained. Hence, an affine transformation matrix (1/d)L(φ) can be uniquely obtained from the position S(φ), the tilting V(φ) and a length d of the oblique side of the circular conic.

Next, among the rotational angles θ[0], θ[1], θ[2], . . . and θ[N−1], one closest to the rotational angle φ is selected. It is presumed that the selected rotational angle is θ[k].

According to this technique, an interpolated image B(φ) relative to the rotational angle φ is obtained from the normalized image B[k].

The simplest scheme is to directly use the normalized image B[k] as the interpolated image B(φ). This is effective to suppress the calculation amount when N is sufficiently large (e.g., equal to or greater than 20).

In addition, as explained above, the normalized image B[k] is associated with the affine transformation matrix (1/d)L[k] for projecting the real world in the image and the inverse affine transformation matrix d L[k]$^{-1}$.

Hence, when an affine transformation $$(1/d)L(\phi) d\, L[k]^{-1} = L(\phi)L[k]^{-1}$$

is performed on the normalized image B[k], the interpolated image B($\phi$) is obtained.

According to this technique, only one normalized image B[k] is used to obtain one interpolated image B($\phi$), but it is possible to obtain one interpolated image B($\phi$) from the plurality of normalized images B[k]. For example, for two normalized images B[k] and B[k+1] having the rotational angle satisfying $$\theta[k] \le \phi < \theta[k+1],$$

the affine transformation is performed as explained above.

Next, this technique extracts the left side ($\phi-\theta[k]$)/($\theta[k+1]-\theta[k]$) of the image obtained by performing the affine transformation on B[k], and extracts the right side ($\theta[k+1]-\phi$)/($\theta[k+1]-\theta[k]$) of the image obtained by performing the affine transformation on B[k+1]. Those are arranged side by side to obtain the interpolated image B($\phi$). In this case, $\phi$ and $\theta$ have directions set to increase when a side close to the user turns from the left to the right, but in the case of the reverse direction, if the directions are switched, the similar technique can be applied.

Moreover, by arranging a greater number of normalized images not by arranging the two normalized images, like the above-explained case, the normalized image is cut into vertical stripes relative to the rotational direction, and the stripes are extracted and arranged to obtain the interpolated image B($\phi$).

Figure 8:
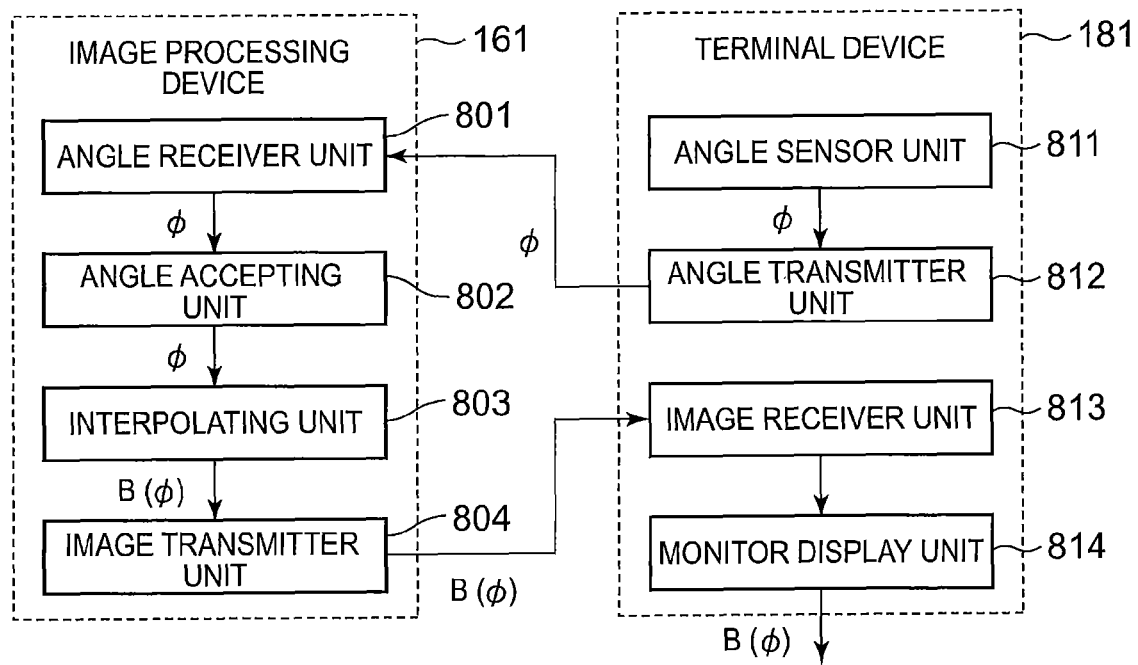
FIG. 8 is an explanatory diagram showing a relationship between each unit of the image processing device and each unit of a terminal device according to the embodiment.
Figure 9:
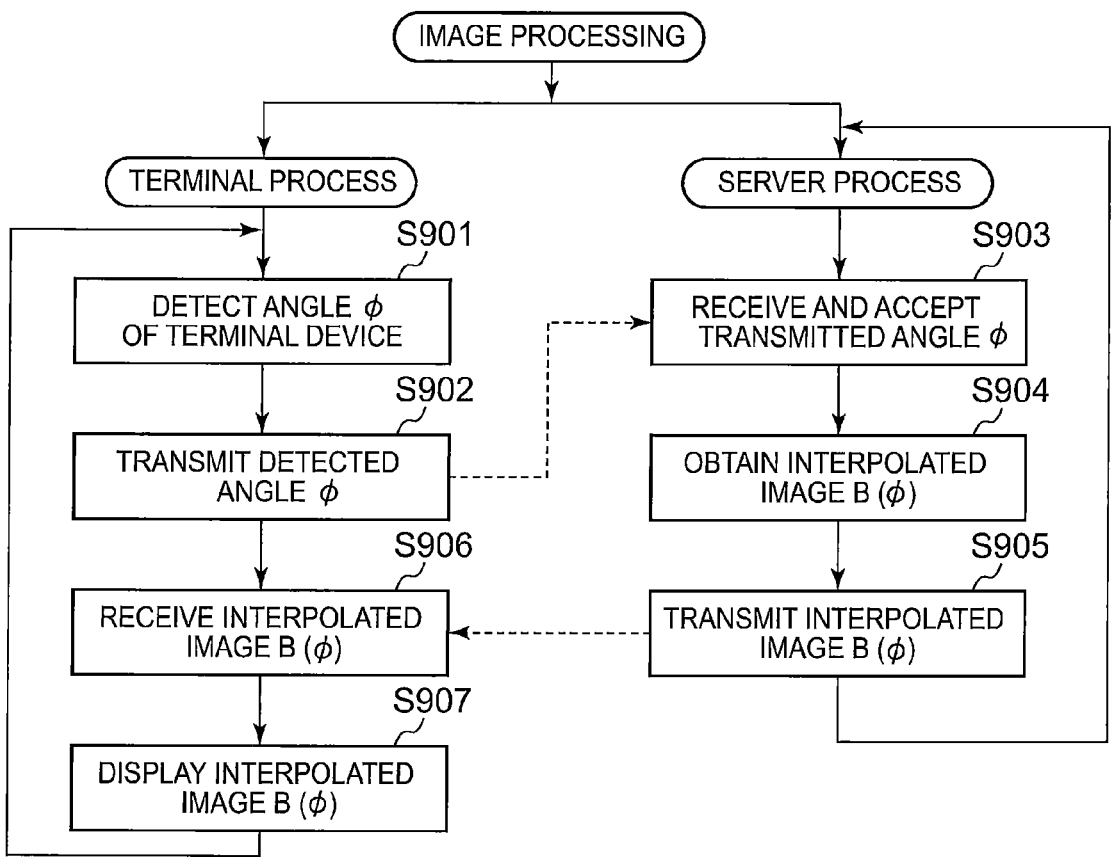
FIG. 9 is a flowchart showing a flow of a control for an imaging process executed by each unit of the image processing device and each unit of the terminal device.

Next, FIG. 8 is an explanatory diagram showing a relationship between each unit of the image processing device 161 and each unit of the terminal device 181 according to this embodiment. FIG. 9 is a flowchart showing a flow of a control for an image processing executed by each unit of the image processing device 161 and each unit of the terminal device 181. Hereinafter, the explanation will be given with reference to those figures.

As explained above, the image processing device 161 and the terminal device 181 may be configured as a single device, or may be configured as separate devices. It is also optional to change in which device each unit is disposed. Hence, the figures illustrate the most typical configuration.

As shown in the figures, the image processing device 161 of this embodiment includes an angle receiver unit 801, an angle accepting unit 802, an interpolating unit 803, and an image transmitter unit 804.

Conversely, the terminal device 181 includes an angle sensor unit 811, an angle transmitter unit 812, an image receiver unit 813, and a monitor display unit 814.

When the image processing starts, the image processing device 161 executes a server process, and the terminal device 181 executes a terminal process.

First, in the terminal device 181, the angle sensor unit 811 senses an angle $\phi$ of the terminal device 181 around a predetermined axis (step S901).

When the product imaging device 121 captures an image of the product, it is typical that tilting along three axes are detected, but in the terminal device 181, it is sufficient if only one acceleration sensor is used and a tilting relative to the gravitational direction is detected. Needless to say, it is fine if tilting along three axes is detected.

Next, the angle transmitter unit 812 transmits the sensed angle $\phi$ to the image processing device 161 (step S902).

The angle receiver unit 801 in the image processing device 161 receives the angle $\phi$ transmitted from the terminal device 181, and causes the angle accepting unit 802 to accept the received angle (step S903).

Next, the interpolating unit 803 obtains the interpolated image B($\phi$) based on the above-explained algorithm from the accepted angle $\phi$ (step S904).

Moreover, the image transmitter unit 804 transmits the obtained interpolated image B($\phi$) to the terminal device 161 (step S905) and the process returns to the step S903.

In the terminal device 181, the image receiver unit 813 receives the interpolated image B($\phi$) transmitted from the image processing device 161 (step S906).

Next, the monitor display unit 814 displays the received interpolated image B($\phi$) on the monitor screen (step S907), and the process returns to the step S901.

As explained above, according to this embodiment, by simply tilting the terminal device 181, the product 301 displayed on the monitor screen of the terminal device 181 is also rotated in accordance with the tilting, and the user can easily view the appearance of the product 301 from the entire surroundings.

When the image processing device 161 and the terminal device 181 are configured as a single device, the angle $\phi$ detected by the angle sensor unit 811 is given to the interpolating unit 803, the interpolated image B($\phi$) obtained by the interpolating unit 803 is given to the monitor display unit 814, and the interpolated image B($\phi$) is displayed on the monitor screen. That is, the terminal device 181 includes the angle sensor unit 811, the interpolating unit 803, and the monitor display unit 814 in this case.

Moreover, when the terminal device 181 is configured using a general personal computer having no tilt sensor, a configuration may be employed in which the user inputs the angle $\phi$ through an input device like a keyboard or a mouse, not by sensing the angle $\phi$ using the angle sensor unit 811. For example, an operational system that increases $\phi$ when a first button of the keyboard is depressed and decreases $\phi$ when a second button is depressed, or an operational system that links the displacement of the mouse with the value of $\phi$ may be employed.

Furthermore, according to the above-explained example, the detected angle $\phi$ is directly used to display the interpolated image B($\phi$). However, by applying a constant k larger than 1, an interpolated image B(k$\phi$) relative to the sensed angle $\phi$ may be displayed. That is, the angle accepting unit 802 multiplies the accepted angle by k.

According to the technique of displaying the interpolated image B($\phi$), in order to observe the product 301 from the entire surroundings, it is necessary for the user to rotate the terminal device 181 itself by 360 degrees by a turn.

Conversely, according to the technique of displaying the interpolated image B(k$\phi$), the rotational amount of the terminal device 181 necessary to observe the product 301 from the entire surroundings is only (360/k) degrees.

For example, when k=4, if the user changes the tilting of the terminal device 181 by 90 degrees, it becomes possible to observe the product 301 from the entire surroundings.

The process of multiplying the angle by k may be executed by, for example, the terminal device 181. For example, the angle transmitter unit 812 multiplies the detected angle $\phi$ by k, and transmits an angle k$\phi$.

An explanation below will be given of another technique of obtaining the interpolated image B($\phi$) from the normalized images B[0], B[1], B[2], ... and B[N-1], the rotational angles $\theta[0], \theta[1], \theta[2], \ldots$ and $\theta[N-1]$, and the given rotational angle $\phi$.

That is, it is presumed that the product 301 is a sphere, and developed figures are obtained from the normalized images B[0], B[1], B[2], ... and B[N−1] through interrupted normal polyconic projection. Next, a sphere is formed from the developed figures, and the interpolated image B(φ) obtained when observing the sphere at a position S(φ) and a tilting V(φ) is created.

According to the interrupted normal polyconic projection at the time of creating a globe, a globe surface is cut by each longitude of 30 degrees to form 12 boat forms. According to this embodiment, the number of boat forms is N. Moreover, as explained above, it is presumed that θ[0]=0. Next, (0) boat forms from the longitude of (θ[N−1]+2π/2 to the longitude of 2π and from the longitude of 0 to the longitude of θ[1]/2 are formed from the normalized image B[0], (1) a boat form from the longitude of (θ[0]+θ[1])/2 to the longitude of (θ[1]+θ[2])/2 is formed from the normalized image B[1], (2) a boat form from the longitude of (θ[1]+θ[2])/2 to the longitude of (θ[2]+θ[3])/2 is formed from the normalized image B[2], (k) a boat form from the longitude of (θ[k−1]+θ[k])/2 to the longitude of (θ[k]+θ[k+1])/2 is formed from the normalized image B[k], and (N−1) a boat form from the longitude of (θ[N−2]+θ[N−1])/2 to the longitude of (θ[N−1]+2π)/2 is formed from the normalized image B[N−1].

The simplest technique of forming the boat forms is to directly cut out a position corresponding to the boat form from each normalized image. This technique is suitable when the entire shape of the product 301 is similar to a sphere.

By joining the N number of boat forms formed in this manner, a substantial sphere can be virtually formed. Thereafter, the interpolated image B(φ) obtained when the substantial sphere is observed at the position S(φ) and the tilting V(φ) is created.

Moreover, like polyhedron approximation to be discussed later, there is also a technique of setting the position S[k] as a visual point position, pasting boat forms on the surface of a sphere to form a projection plane, and projecting the normalized image B[k] on the boat form. According to this technique, the surface of the sphere covering the product 301 is divided into a plurality of boat form areas, and the normalized image is projected on each boat form area.

As explained above, there is the other technique of approximating the product 301 with a virtual convex polyhedron. The convex polyhedron similar to the entire shape of the product is selected in this technique.

Next, a convex polyhedron model of the product 301 is formed by performing the following process on each polygon disposed on the surface of the convex polyhedron.

First, among the normalized images B[0], B[1], B[2], ... and B[N−1], a normalized image B[k] having the tilting V[0], V[1], V[2], ... or V[N−1] at the time of generation closest to the normal line direction of the polygon is selected.

The normalized image B[k] is virtually disposed at the position of the product 301 at the rotational angle θ[k]. Next, the position S[k] is taken as the visual point position, and the polygon is taken as the projection plane, thereby projecting the normalized image B[k] on the polygon.

Once such substantially spherical model and convex polyhedron model are formed, it becomes possible to view those models from various directions.

This application claims the benefit of priority based on Japanese Patent Application No. 2010-192927 filed on Aug. 30, 2010, the entire specification, claims and drawings of which are herein incorporated in this specification by reference.

INDUSTRIAL APPLICABILITY

According to the present invention, it becomes possible to provide a product imaging device, a product imaging method, an image conversion device, an image processing device, an image processing system, a program and an information recording medium which appropriately allow a user to easily capture an image sequence of the entire viewable outside surface of a product.

DESCRIPTION OF REFERENCE NUMERALS

101 Image processing system
121 Product imaging device
141 Image conversion device
161 Image processing device
181 Terminal device
201 Image sensor unit
202 Instruction receiving unit
203 Memory unit
204 Finder display unit
205 Tilt sensor unit
301 Product
311 Already-captured image
312 Bar graph indicating a tilting when already-captured image was captured
321 Live preview image
322 Bar graph indicating current tilting
331 Finder image
601 Image receiving unit
602 Converter unit
611 Extracting unit
612 Estimating unit
613 Approximating unit
614 Output unit
801 Angle receiver unit
802 Angle accepting unit
803 Interpolating unit
804 Image transmitter unit
811 Angle sensor unit
812 Angle transmitter unit
813 Image receiver unit
814 Monitor display unit

The invention claimed is:

1. An image processing device comprising:
at least one non-transitory memory operable to store program code;
at least one processor operable to read said program code and operate as instructed by said program code, said program code including:
angle accepting code that causes said at least one processor to accept an angle around a rotational axis passing through a product; and
interpolating code that causes said at least one processor to interpolate an image sequence of entire surroundings of the product including a plurality of normalized images each associated with a rotational angle based on the accepted angle, and to obtain an interpolated image showing an appearance of the product as viewed at the accepted angle, wherein the interpolating code further causes said at least one processor to:

select normalized images B[k] and B[k+1] associated with rotational angles θ[k] and θ[k+1] between the accepted angle φ among rotational angles θ[0], θ[1], . . . and θ[N−1] (where θ[0]≤θ[1]≤ . . . and ≤θ[N−1]) associated with respective normalized images B[0], B[1], . . . and B[N−1] included in the image sequence of entire surroundings, generate a first image L(φ) L[k]$^{-1}$B[k] and a second image L(φ) L[k+1]$^{-1}$B[k+1] from affine transformation matrixes L[k] and L[k+1] for projecting a real world object in normalized images B[k] and B[k+1], and an affine transformation matrix L(φ) relative to the accepted angle φ for projecting the real world in an image, divide the first image L(φ) L[k]$^{-1}$B[k] into image regions of (φ−θ[k]) and (θ[k+1]−φ) through a dividing line parallel to the center axis, and extract a third image at a side where the rotational angle around the center axis is smaller than the accepted angle, divide the second image L(φ) L[k+1]$^{-1}$B[k+1] into image regions of (φ−θ[k]) and (θ[k+1]−φ) through a dividing line parallel to the center axis, and extract a fourth image at a side where the rotational angle around the center axis is larger than the accepted angle, and dispose and arrange side by side the third image and the fourth image at a side where the rotational angle around the center axis is smaller than the accepted angle and a side where the rotational angle around the center axis is larger than the accepted angle, thereby obtaining the interpolated image.

2. An image processing method comprising:

an angle accepting step of accepting an angle around a rotational axis passing through a product; and an interpolating step of interpolating an image sequence of entire surroundings of the product including a plurality of normalized images each associated with a rotational angle based on the accepted angle, and obtaining an interpolated image showing an appearance of the product as viewed at the accepted angle, in the interpolating step, selecting normalized images B[k] and B[k+1] associated with rotational angles θ[k] and θ[k+1] between the accepted angle φ among rotational angles θ[0], θ[1], . . . and θ[N−1] (where θ[0]≤θ[1]≤ . . . and ≤θ[N−1]) associated with respective normalized images B[0], B[1], . . . and B[N−1] included in the image sequence of entire surroundings, generating a first image L(φ) L[k]$^{-1}$B[k] and a second image L(φ) L[k+1]$^{-1}$B[k+1] from affine transformation matrixes L[k] and L[k+1] for projecting a real world object in normalized images B[k] and B[k+1], and an affine transformation matrix L(φ) relative to the accepted angle φ for projecting the real world in an image, dividing the first image L(φ) L[k]$^{-1}$B[k] into image regions of (φ−θ[k]) and (θ[k+1]−φ) through a dividing line parallel to the center axis, and extracting a third image at a side where the rotational angle around the center axis is smaller than the accepted angle, dividing the second image L(φ) L[k+1]$^{-1}$B[k+1] into image regions of (φ−θ[k]) and (θ[k+1]−φ) through a dividing line parallel to the center axis, and extracting a fourth image at a side where the rotational angle around the center axis is larger than the accepted angle, and disposing and arranging side by side the third image and the fourth image at a side where the rotational angle around the center axis is smaller than the accepted angle and a side where the rotational angle around the center axis is larger than the accepted angle, thereby obtaining the interpolated image.

3. A non-transitory computer-readable non-temporal information recording medium recording therein a program that allows a computer to function as:

an angle accepting unit that accepts an angle around a rotational axis passing through a product; and an interpolating unit which interpolates an image sequence of entire surroundings of the product including a plurality of normalized images each associated with a rotational angle based on the accepted angle, and which obtains an interpolated image showing an appearance of the product as viewed at the accepted angle, the interpolating unit, selects normalized images B[k] and B[k+1] associated with rotational angles θ[k] and θ[k+1] between the accepted angle φ among rotational angles θ[0], θ[1], . . . and θ[N−1] (where θ[0]≤θ[1]≤ . . . and ≤θ[N−1]) associated with respective normalized images B[0], B[1], . . . and B[N−1] included in the image sequence of entire surroundings, generates a first image L(φ) L[k]$^{-1}$B[k] and a second image L(φ) L[k+1]$^{-1}$B[k+1] from affine transformation matrixes L[k] and L[k+1] for projecting a real world object in normalized images B[k] and B[k+1], and an affine transformation matrix L(φ) relative to the accepted angle φ for projecting the real world in an image, divides the first image L(φ) L[k]$^{-1}$B[k] into image regions of (φ−θ[k]) and (θ[k+1]−φ) through a dividing line parallel to the center axis, and extracts a third image at a side where the rotational angle around the center axis is smaller than the accepted angle, divides the second image L(φ) L[k+1]$^{-1}$B[k+1] into image regions of (φ−θ[k]) and (θ[k+1]−φ) through a dividing line parallel to the center axis, and extracts a fourth image at a side where the rotational angle around the center axis is larger than the accepted angle, and disposes and arranges side by side the third image and the fourth image at a side where the rotational angle around the center axis is smaller than the accepted angle and a side where the rotational angle around the center axis is larger than the accepted angle, thereby obtaining the interpolated image.

\* \* \* \* \*